US010552747B2

(12) United States Patent
Petersen

(10) Patent No.: US 10,552,747 B2
(45) Date of Patent: Feb. 4, 2020

(54) AUTOMATIC ACTIONS BASED ON CONTEXTUAL REPLIES

(71) Applicant: Google Inc., Mountain View, CA (US)

(72) Inventor: Morten Just Petersen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 776 days.

(21) Appl. No.: 14/968,396

(22) Filed: Dec. 14, 2015

(65) Prior Publication Data

US 2016/0162791 A1 Jun. 9, 2016

Related U.S. Application Data

(63) Continuation of application No. 14/258,692, filed on Apr. 22, 2014, now Pat. No. 9,213,941.

(51) Int. Cl.
*G06N 5/04* (2006.01)
*G06Q 10/10* (2012.01)

(52) U.S. Cl.
CPC ............. *G06N 5/04* (2013.01); *G06Q 10/107* (2013.01)

(58) Field of Classification Search
CPC ......... G06N 5/04; G06Q 10/10; G06Q 10/107
See application file for complete search history.

(56) References Cited

U.S. PATENT DOCUMENTS

| 7,580,719 | B2 | 8/2009 | Karmarkar |
| 8,306,511 | B2 | 11/2012 | Ling et al. |
| 8,385,975 | B2 | 2/2013 | Forutanpour et al. |
| 8,423,577 | B1* | 4/2013 | Lee ................... G06Q 10/1093 705/5 |
| 8,996,639 | B1 | 3/2015 | Faaborg et al. |
| 2002/0059164 | A1 | 5/2002 | Shtivelman |
| 2005/0108345 | A1 | 5/2005 | Suzuki |
| 2009/0106695 | A1 | 4/2009 | Perry et al. |
| 2009/0254624 | A1 | 10/2009 | Baudin et al. |

(Continued)

FOREIGN PATENT DOCUMENTS

| CN | 102707967 A | 10/2012 |
| EP | 2393046 A1 | 12/2011 |

OTHER PUBLICATIONS

International Preliminary Report on Patentability from International Application No. PCT/US2015/021820, dated Nov. 3, 2016 7 pgs.

(Continued)

*Primary Examiner* — Eric Nilsson
(74) *Attorney, Agent, or Firm* — Shumaker & Sieffert, P.A.

(57) ABSTRACT

A computing device includes at least one processor and at least one module, operable by the at least one processor to receive an communication, determine, based at least in part on the communication, one or more candidate responses to the communication, and receive an indication of user input that selects a candidate response from the one or more candidate responses. The at least one module may be further operable by the at least one processor, responsive to receiving the indication of user input that selects the candidate response, to send the candidate response, determine, based at least in part on at least one of the candidate response and the communication, an operation that is contextually related to the candidate response, and execute the operation.

13 Claims, 6 Drawing Sheets

(56) References Cited

U.S. PATENT DOCUMENTS

| | | | |
|---|---|---|---|
| 2009/0282114 A1 | 11/2009 | Feng et al. | |
| 2012/0245944 A1 | 9/2012 | Gruber et al. | |
| 2013/0073662 A1* | 3/2013 | Meunier | G06Q 10/107 709/206 |
| 2013/0304677 A1 | 11/2013 | Gupta et al. | |
| 2013/0346347 A1 | 12/2013 | Patterson et al. | |
| 2014/0052680 A1* | 2/2014 | Nitz | G06N 5/02 706/46 |
| 2014/0088954 A1 | 3/2014 | Shirzadi et al. | |
| 2015/0089007 A1 | 3/2015 | Amoroso et al. | |
| 2015/0302301 A1 | 10/2015 | Petersen | |
| 2017/0180294 A1 | 6/2017 | Milligan et al. | |
| 2018/0089588 A1 | 3/2018 | Ravi et al. | |

OTHER PUBLICATIONS

Examination Report from counterpart European Application No. 15715043.4, dated Jan. 25, 2018, 6 pp.

Response to Examination Report dated Jan. 25, 2018, from counterpart European Application No. 15715043.4, filed May 29, 2018, 3 pp.

Ravi et al., "Large Scale Distributed Semi-Supervised Learning Using Streaming Approximation," Proceedings of the 19th International Conference on Artificial Intelligence and Statistics (AISTATS), JMLR: W&CP, vol. 51, May 16, 2016, 10 pp.

Hedge et al., "Efficient Machine Learning Using Random Projections," Department of Electrical and Computer Engineering, Rice University—Department of Electrical Engineering and Computer Science, The University of Michigan at Ann Arbor, Dec. 29, 2007, 2 pp.

International Search Report and Written Opinion from International Application No. PCT/US2015/021820, dated Jun. 16, 2015, 9 pp.

Prosecution History from U.S. Appl. No. 14/258,692, dated Sep. 25, 2014 through Aug. 13, 2015 93 pp.

First Office Action and Search Report, and translation thereof, from counterpart Chinese Application No. 201580020987.6, dated Dec. 21, 2018, 17 pp.

Second Office Action, and translation thereof, from counterpart Chinese Application No. 201580020987.6, dated Apr. 1, 2019, 14 pp.

Summons to attend oral proceedings pursuant to Rule 115(1) EPC from counterpart European Application No. 15715043.4, dated Sep. 19, 2018, 10 pp.

Written Submissions from counterpart European Application No. 15715043.4, filed Jan. 9, 2019, 39 pp.

Decision to Refuse from counterpart European Application No. 15715043.4, dated Feb. 28, 2019, 38 pp.

\* cited by examiner

AUTOMATIC ACTIONS BASED ON CONTEXTUAL REPLIES

This application is a continuation of U.S. application Ser. No. 14/258,692, filed Apr. 22, 2014, the entire content of which is hereby incorporated by reference.

BACKGROUND

Many computing devices enable a user to respond to received communications sent by users of other computing devices. Some such computing devices provide one or more stock responses, stored by the computing device, that a user may choose from when composing a response to the received communication. In response to receiving an indication of user input that selects a particular stock response, the computing device may send the selected stock response from the recipient's computing device to the computing device of a different user that sent the received communication.

SUMMARY

In one example, a method includes receiving, by a computing device, a communication, determining, based at least in part on the communication, one or more candidate responses to the communication, and receiving, by the computing device, an indication of user input that selects a candidate response from the one or more candidate responses. The method may further include, responsive to receiving the indication of user input that selects the candidate response, sending, by the computing device, the candidate response, determining, based at least in part on at least one of the candidate response and the communication, an operation that is contextually related to the candidate response, and executing, by the computing device, the operation.

In another example, a computing device includes at least one processor and at least one module, operable by the at least one processor to receive a communication, determine, based at least in part on the communication, one or more candidate responses to the communication, and receive an indication of user input that selects a candidate response from the one or more candidate responses. The at least one module may be further operable by the at least one processor, responsive to receiving the indication of user input that selects the candidate response, to send the candidate response, determine, based at least in part on at least one of the candidate response and the communication, an operation that is contextually related to the candidate response, and execute the operation.

In another example, a computer-readable storage medium is encoded with instructions that, when executed, cause at least one processor to receive a communication, determine, based at least in part on the communication, one or more candidate responses to the communication, and receive an indication of user input that selects a candidate response from the one or more candidate responses. The computer-readable storage medium may be further encoded with instructions that, when executed, cause the at least one processor, responsive to receiving the indication of user input that selects the candidate response, to send the candidate response, determine, based at least in part on at least one of the candidate response and the communication, an operation that is contextually related to the candidate response, and execute the operation.

The details of one or more examples are set forth in the accompanying drawings and the description below. Other features, objects, and advantages will be apparent from the description and drawings, and from the claims.

DETAILED DESCRIPTION

In general, techniques of this disclosure are directed to providing candidate responses in reply to a received communication and automatically performing one or more operations that are contextually related to at least one selected candidate response. That is, according to techniques of the present disclosure, a computing device may output one or more candidate responses that are relevant to a received communication and, responsive to receiving a selection of a particular candidate response, perform one or more operations or "actions" related to the selected candidate response. As an example, a computing device may not only send a particular candidate response upon selection of that candidate response by a user, but also create a new calendar event for a meeting associated with the received communication and/or the particular candidate response.

In this way, computing devices implementing techniques of this disclosure may reduce or eliminate the need for the user to provide additional input to cause the computing device to perform the relevant operations. Such functionality may be advantageous when it is difficult or undesirable for a user to manually provide input to a computing device.

Figure 1:
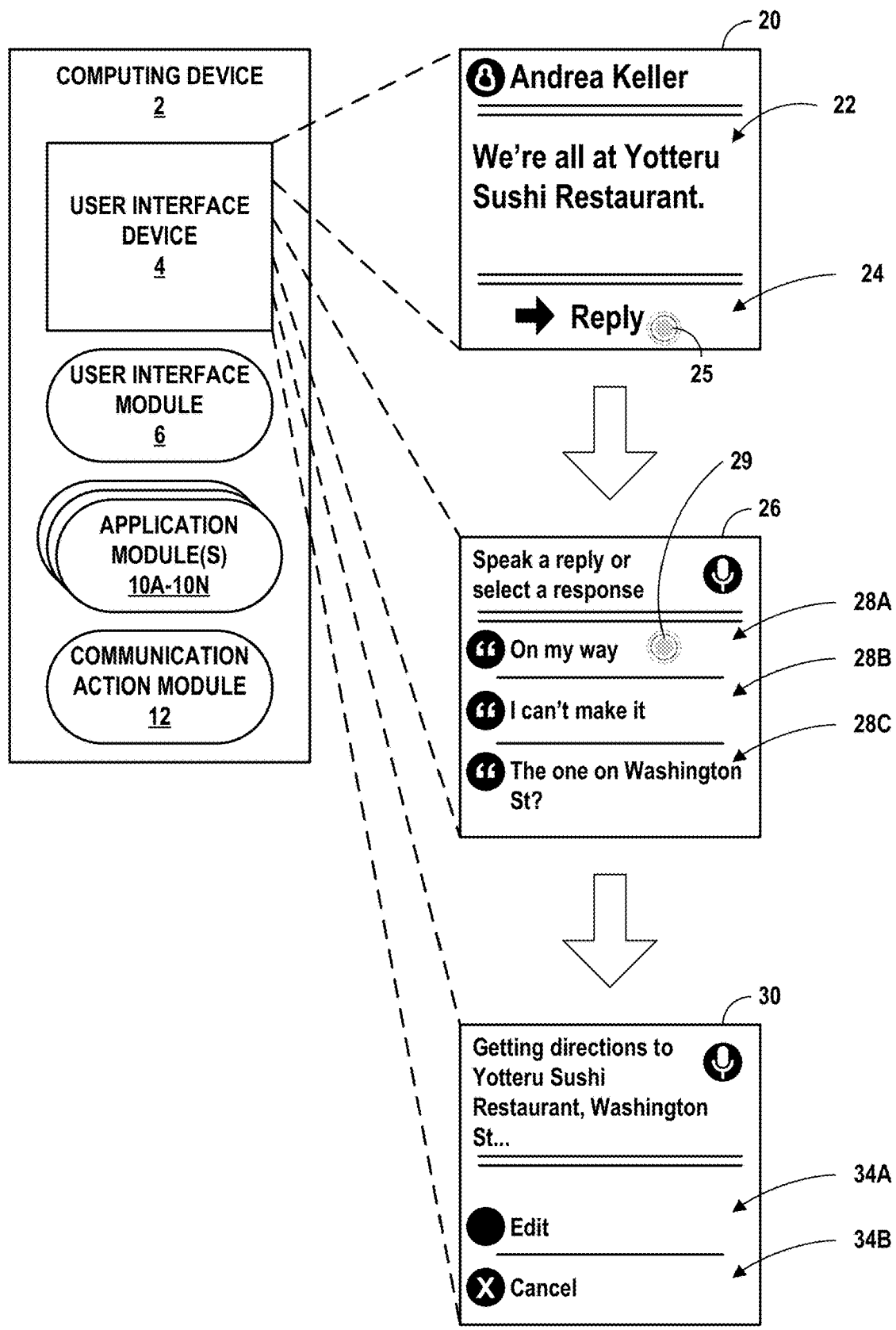
FIG. 1 is a block diagram illustrating an example computing device and graphical user interfaces (GUIs) for performing contextually related operations responsive to sending a response to a received communication, in accordance with one or more techniques of the present disclosure.

FIG. 1 is a block diagram illustrating an example computing device 2 and graphical user interfaces (GUIs) 20, 26, 30 for performing contextually related operations responsive to sending a response to a received communication, in accordance with one or more techniques of the present disclosure. Examples of computing device 2 may include, but are not limited to, portable, mobile, or other devices, such as mobile phones (including smartphones), laptop computers, desktop computers, tablet computers, smart television platforms, personal digital assistants (PDAs), server computers, mainframes, and the like. For instance, in the example of FIG. 1, computing device 2 may be a wearable computing device, such as a smartwatch.

Computing device 2, as shown in the example of FIG. 1, includes user interface (UI) device 4. UI device 4 of computing device 2 may be configured to function as an input device and/or an output device for computing device 2. UI device 4 may be implemented using various technologies. For instance, UI device 4 may be configured to receive input from a user through tactile, audio, and/or video feedback. Examples of input devices include a presence-sensitive display, a presence-sensitive or touch-sensitive input device, a mouse, a keyboard, a voice responsive system, video camera, microphone or any other type of device for detecting a command from a user. In some examples, a presence-sensitive display includes a touch-sensitive or presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive technology. That is, UI device 4 of computing device 2 may include a presence-sensitive device that may receive tactile input from a user of computing device 2. UI device 4 may receive indications of the tactile input by detecting one or more gestures from the user (e.g., when the user touches or points to one or more locations of UI device 4 with a finger or a stylus pen).

UI device 4 may additionally or alternatively be configured to function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, organic light-emitting diode (OLED) display, e-ink, or similar monochrome or color display capable of outputting visible information to a user of computing device 2. Additional examples of an output device include a speaker, a cathode ray tube (CRT) monitor, a liquid crystal display (LCD), or other device that can generate intelligible output to a user. For instance, UI device 4 may present output to a user of computing device 2 as a graphical user interface that may be associated with functionality provided by computing device 2. In this way, UI device 4 may present various user interfaces of applications executing at or accessible by computing device 2 (e.g., an electronic message application, an Internet browser application, etc.). A user of computing device 2 may interact with a respective user interface of an application to cause computing device 2 to perform operations relating to a function.

In some examples, UI device 4 of computing device 2 may detect two-dimensional and/or three-dimensional gestures as input from a user of computing device 2. For instance, a sensor of UI device 4 may detect the user's movement (e.g., moving a hand, an arm, a pen, a stylus, etc.) within a threshold distance of the sensor of UI device 4. UI device 4 may determine a two or three dimensional vector representation of the movement and correlate the vector representation to a gesture input (e.g., a hand-wave, a pinch, a clap, a pen stroke, etc.) that has multiple dimensions. In other words, UI device 4 may, in some examples, detect a multi-dimension gesture without requiring the user to gesture at or near a screen or surface at which UI device 4 outputs information for display. Instead, UI device 4 may detect a multi-dimensional gesture performed at or near a sensor which may or may not be located near the screen or surface at which UI device 4 outputs information for display.

In the example of FIG. 1, computing device 2 includes user interface (UI) module 6, device location module 8, application modules 10A-10N (collectively "application modules 10"), and communication action module 12. Modules 6, 8, 10, and/or 12 may perform one or more operations described herein using hardware, software, firmware, or a mixture thereof residing within and/or executing at computing device 2. Computing device 2 may execute modules 6, 8, 10, and/or 12 with one processor or with multiple processors. In some examples, computing device 2 may execute modules 6, 8, 10, and/or 12 as a virtual machine executing on underlying hardware. Modules 6, 8, 10, and/or 12 may execute as one or more services of an operating system or computing platform or may execute as one or more executable programs at an application layer of a computing platform.

UI module 6, as shown in the example of FIG. 1, may be operable by computing device 2 to perform one or more functions, such as receive input and send indications of such input to other components associated with computing device 2, such as modules 8, 10, and/or 12. UI module 6 may also receive data from components associated with computing device 2, such as modules 8, 10, and/or 12. Using the data received, UI module 6 may cause other components associated with computing device 2, such as UI device 4, to provide output based on the received data. For instance, UI module 6 may receive data from one of application modules 10 to display a GUI.

Application modules 10, as shown in the example of FIG. 1, may include functionality to perform any variety of operations on computing device 2. For instance, application modules 10 may include a word processor, an email application, a web browser, a multimedia player, a calendar application, an operating system, a distributed computing application, a graphic design application, a video editing application, a web development application, or any other application. In some examples, one or more of application modules 10 may be operable to receive communications from other devices, such as email messages, calendar alerts or meeting requests, or other communications. For instance, one of application modules 10 (e.g., application module 10A) may be a text messaging (e.g., SMS/MMS) application. Application module 10A may include functionality to compose and send communications, receive communications, respond to received communications, and other functions.

In the example of FIG. 1, communication action module 12 may be operable to determine candidate responses to received communications and determine one or more operations that are contextually related to a response communication, in accordance with the techniques described herein. That is, communication action module 12 may include functionality to provide one or more relevant messages that a user may select to cause computing device 2 to send the message as a response to a received communication. Furthermore, communication action module 12 may include functionality to execute an operation that is relevant, based at least in part on the received communication and/or a communication sent in response to the received communication, to the context of the correspondence. Relevance (e.g., of an operation or of a response message), generally, may be an indication of semantic similarity, contextual similarity, or any other type of similarity. Relevance, in some examples, may be represented by a probability value or score that indicates a level of similarity between two objects, or a level of similarity between two groups of objects (e.g., the number of objects that exist in both groups, the number of objects in one group that exist in the other group, the percentage of objects that exist in both groups, or other value).

Communication action module 12 may determine messages a user can select in response to a received communication and, in addition to sending a selected response, communication action module 12 may cause computing device 2 to perform an operation related to the sent response. Further details and example operations of communication action module 12 are described with respect to the following examples.

Computing device 2 may, in the example of FIG. 1, receive a communication. A received communication may include information (e.g., generated based on input provided by a user of another device). Examples of information that may be included in a received communication include text (e.g., letters, words, numbers, punctuation, etc.), emoji, images or icons, video, audio, or other information. The received communication may be structured or formatted according to one or more protocols. For instance, a received communication may be an SMS message. The SMS message may include the textual information "We're all at Yotteru Sushi Restaurant."

In the example of FIG. 1, responsive to receiving a communication, computing device 2 may output an indication of the received communication for display. In general, an indication of a received communication may be any visual representation of the communication, such as a notification or other visual object output for display as part of a GUI. Computing device 2 may provide the message to one or more of application modules 10 that are specified to handle SMS messages, such as application module 10A. Application module 10A may receive the SMS message and may cause one or more other components of computing device 2 to output an indication of the message (e.g., for display to a user of computing device 2). That is, responsive to receiving the SMS message, application module 10A may send data to UI module 6 to cause UI device 4 to display GUI 20. As shown in the example of FIG. 1, GUI 20 includes an indication of the information included in the SMS message (e.g., text 22, "We're all at Yotteru Sushi Restaurant") and a user-selectable element 24 to reply to the message. In some examples, an application module may cause additional or other information to be output for display, such as a time at which the message was received.

Computing device 2 may, in the example of FIG. 1, receive an indication of input that instructs computing device 2 to enable a user to compose and/or select a response to the received communication. For instance, a user of computing device 2 may perform input 25 at UI device 4. UI device 4 may detect input 25 and send an indication of the input to UI module 6. UI module 6 may provide data to application module 10A based on the received indication and application module 10A may determine that input 25 corresponds to a selection of element 24.

In the example of FIG. 1, computing device 2 may determine one or more candidate responses to the received communication, based at least in part on the received communication. Responsive to receiving data indicating a user's selection to respond to the SMS message (e.g., an indication of input 25), application module 10A may communicate with communication action module 12 to obtain at least one candidate response. A candidate response may be a message that a user may select as a response to a received communication. For instance, in the example of FIG. 1, each candidate response determined by communication action module 12 may be a message that computing device 2 may send, based on a user's selection, in order to respond to the SMS message, "We're all at Yotteru Sushi Restaurant."

In order to obtain candidate responses, application module 10A may request candidate responses from communication action module 12. In some examples, a request for candidate responses to a received communication may include at least a portion of the information included in the received communication. In some examples, a request may include additional or other information, such as communication metadata, location information, user information, other communications (e.g., other messages in the thread or chain of communications between the user of computing device 2 and the sender of the received communication), or other information about the received communication, about the computing device, or about a user of the computing device. In some examples, application modules 10 may only generate a request and/or obtain personal data (e.g., information included in the received communication and/or other information) if a user of computing device 2 provides explicit permission.

Communication action module 12 may receive a request from application 10A and determine candidate responses. In some examples, communication action module 12 may determine candidate responses based at least in part on the subject matter of the received communication. That is, communication action module 12 may, in some examples, determine one or more subjects included in the received communication and use that information to predict candidate responses. For instance, communication action module 12 may perform one or more text analysis and/or natural language processing techniques (e.g., clustering, noun phrase extraction, etc.) on the received communication to determine the subject or subjects of the communication (e.g., semantic elements). A subject, in general, may be a person, place, item or object, etc. Examples of a semantic element may include a particular store or restaurant, a chain of stores or chain of restaurants, a geographical location (e.g., a city, a state, a country, etc.), a person, an object (e.g., a hockey stick, a watch, a television, a dog, etc.), a concept (e.g., pregnancy, milkshakes, existentialism, etc.), any combination or type thereof, or any other focus of information. In some examples, a collection of semantic elements that are included in a communication may represent a semantic meaning of the communication. That is, a semantic meaning may, in some examples, be based on the subject or subjects (e.g., items, places, concepts, etc.) included in the communication.

In some examples, communication action module 12 may determine candidate responses by using one or more lookup tables. For instance, communication action module 12 may determine whether the received communication includes one or more specific words and/or punctuation mark combinations from the lookup table, such as a question word or a question mark character. If the received communication includes the specific combination of words and/or punctuation marks, communication action module 12 may provide the associated candidate responses from the lookup table. If the input to the lookup table is the word "are" and a question mark character, for instance, the lookup table may provide candidate responses such as "Yes," "No," etc. In other words, while described in some examples as predicting candidate responses, communication action module 12 may determine candidate responses is any number of ways, such as providing stored candidate responses using a lookup table, predicting candidate responses based on text analysis, or other ways. Further details of such various techniques are described in FIG. 2.

In some examples, communication action module 12 may determine candidate responses based additionally or alternatively on previously selected responses. That is, to determine candidate responses, communication action module 12 may, in some examples, use information that indicates previously received communications (or subjects thereof) and the communications that have been selected as responses to the previously received communications. By analyzing the received communications and the corresponding selected responses, communication action module 12 may determine likely replies to common messages and/or messages having common subjects. For instance, communication action module 12 may receive a request including the information, "Are you coming?" Communication action module 12 may analyze the text to determine that the received communication is a request for the status of the recipient. Based on the subject of the text, communication action module 12 may determine that the most common replies to similar messages are "I'll be right there," "yes," and "no."

In some examples, the information included in a received communication and/or the candidate responses need not be proper language. For instance, communication action module 12 may receive a request to determine candidate responses that includes the text, "<3" (e.g., a heart emoticon). In such instance, communication action module 12 may determine that the most common responses are "<3", and ":)" (e.g., a smiley emoticon).

In some examples, communication action module 12 may determine candidate responses based on communications previously received by computing device 2 and corresponding responses previously selected by the user of computing device 2. That is, in some examples communication action module 12 may determine candidate responses based on communication data associated with the user of computing device 2. In some examples, communication action module 12 may determine candidate responses based on previously received communications and corresponding responses that are associated with more users. For instance, communication action module 12 may cause computing device 2 to communicate with another computing device (e.g., a server system) to obtain and and/or maintain information including communication data from multiple computing devices. That is, in some examples computing device 2 may determine candidate responses based on aggregate communication data associated with a plurality of users (e.g., the user of computing device 2 and/or other users). In such examples, information about a user's received communications and/or selected response communications may only be used if that user explicitly provides permission (e.g., via his or her respective computing device). Furthermore, any data may be anonymized before transmittal and/or use. That is, information that could identify or categorize a user may be stripped or generalized before providing the communications data (e.g., to the server system).

In some examples, candidate responses may be responses that have been previously selected by a user at least at a threshold frequency. That is, a candidate response may, in some examples, represent a response that was previously provided as a candidate response a number of times and was selected by users a sufficient number of those times to exceed a threshold frequency (e.g., at least 10%, at least 20%, etc.) of selection. In other examples, candidate responses may be based additionally or instead on manual review by developers or administrators (e.g., of the server system). Manual review may be beneficial, for example, to ensure candidate responses use appropriate language and/or are accurate.

In some examples, communication action module 12 may determine candidate responses based additionally or alternatively on contextual information about computing device 2 and/or a user of computing device 2 (e.g., information that defines a context of the computing device). Contextual information, in general, may include any information about the computing device, an environment of the computing device, and/or about a user of the computing device.

In some examples, items of contextual information may be collections of data (e.g., a text data structure, a numeric data structure, or other data structure) that represents a location of the computing device (e.g., a GPS location); information indicating a time as determined by the computing device; information indicating one or more applications installed at the computing device; information indicating one or more applications currently executing at the computing device; information indicating one or more networks (e.g., wireless networks) available to the computing device; data that represents one or more other computing devices in proximity to the computing device (e.g., within 10 feet, within 100 feet, or other distance); data that represents an operating mode (e.g., silent mode, airplane mode, driving mode, standby mode, low battery mode, or any other mode of operation) of the computing device, data obtained from one or more sensors of the computing device (e.g., temperature data, ambient noise level data, light level data, acceleration/movement data, image/video data, and other data), or any other data about the status or current state of the computing device.

In some examples, an item of contextual information may additionally or alternatively be information about a user of the computing device, such as a name of the user, a user identification (UID) of the user, information from one or more social media network service accounts associated with the user, information from one or more calendars or scheduling applications associated with the user, information indicating one or more social or professional relationships of the user (e.g., user contacts), or any other information about the user.

In some examples, communication action module 12 may receive contextual information (e.g., one or more items of contextual information) with a request for candidate responses. For instance, communication module 12 may receive a request from one of application modules 10 that includes an indication of a particular communication as well as one or more items of contextual information each indicating a location of computing device 2. Communication module 12 may provide candidate responses based on the indication of the particular communication as well as on the locations.

In some examples, communication action module 12 may additionally or alternatively obtain contextual information from other sources. For instance, communication module 12 may receive explicit permission from a user (e.g., the user of computing device 2) to access communications information, social media network service account information, or other information pertaining to the user. That is, communication action module 12 may obtain contextual information about computing device 2, information about the user of computing device 2, and/or other information for use in determining candidate responses. In some examples, communication action module 12 may determine candidate responses based on obtained contextual information by determining selected responses that correspond to a similar context.

In the example of FIG. 1, communication action module 12 may determine one or more candidate responses to the SMS message, "We're all at Yotteru Sushi Restaurant" and send at least an indication of the candidate responses to application module 10A. Application module 10A may receive the indication of the determined candidate responses and send data to UI module 6 to cause UI device 4 to display at least one of the candidate responses. For instance, application module 10A may send data to cause UI device 4 to output GUI 26.

GUI 26, as shown in the example of FIG. 1, includes response options 28A-28C (collectively, "response options 28"). Response options 28 may each represent a candidate response received from communication action module 12. That is, responsive to receiving a request for candidate responses to the SMS message "We're all at Yotteru Sushi Restaurant," communication action module 12 may determine three candidate responses: "On my way," "I can't make it," and "The one on Washington St?" corresponding to response options 28A, 28B, and 28C, respectively.

While each representing a candidate response received from communication action module 12 in the example of FIG. 1, one or more of response options 28 may, in other examples, represent other response options, such as responses provided by application module 10A. In some examples, an application module may modify one or more received candidate responses based on various types of information, and one or more of response options 28 may represent a modified candidate response. In any case, response options 28 of GUI 26 may enable the user of computing device 2 to select a candidate response to cause computing device 2 to send in response to the received SMS message. In some examples, GUI 26 may include a manual entry option. A manual entry option may enable the user of computing device 2 to input (e.g., using voice input, touch input, or other input) a custom response. A custom response may be used when, for example, the responses indicated by one of response options 28 are incorrect or inaccurate.

In the example of FIG. 1, computing device 2 may receive an indication of user input that selects a candidate response from the one or more candidate responses. An indication of user input, generally, may be data representing input provided by a user at one or more input devices, such as touch or haptic input, voice input or other audio input, or any other form of input. For instance, the user of computing device 2 may provide input 29 at UI device 4, which may include a tap gesture at or near the location of UI device 4. UI device 4 may detect input 29 and send an indication of the input to UI module 6. UI module 6 may provide data to application module 10A based on the received indication, and application module 10A may determine that input 29 corresponds to a selection of response option 28A.

Responsive to receiving the indication of user input that selects the candidate response, computing device 2 may, in the example of FIG. 1, send the candidate response. That is, selecting one of response options 28 or inputting a custom response may cause application module 10A to respond to the received communication by sending the selected response to one or more other computing devices, which may include a computing device of the recipient for the message. For instance, responsive to receiving an indication of input 29 that selects response option 28A, application module 10A may send the candidate response corresponding to response option 28A (e.g., "On my way"). In some examples, the selected response may be sent directly to the computing device from which the SMS message was received. In some examples, the selected response may be sent to additional or other computing devices, such as one or more devices that, together, represent a network to which computing device 2 is connected (e.g., a cellular or wireless network). That is, computing device 2 may send the selected response to the computing device from which the SMS message was received by sending the response to network devices or other devices situated along a route between the two computing devices. In some examples, the selected response may additionally or alternatively be sent to other devices, such as a server system or a cloud computing environment, for subsequent use in providing improved candidate responses.

In the example of FIG. 1, responsive to receiving the indication of user input that selects the candidate response, computing device 2 may determine, based at least in part on at least one of the candidate response and the received communication, an operation that is contextually related to the candidate response. In other words, computing device 2 determines the operation based at least in part on the candidate response, based at least in part on the received communication, or based at least in part on both the candidate response and the received communication. An operation contextually related to the candidate response may be executable by a computing device (e.g., computing device 2 or other computing device) to perform an action in addition to generating, displaying, and/or sending a response to the received communication. That is, operations contextually related to a response, as defined herein, may not include one or more of: determining candidate responses to a received communication, outputting the candidate responses (e.g., for display to a user), or sending a response to a received communication. Rather, an operation that is contextual related to a response may represent an operation that a user might otherwise manually cause a computing device to perform if he or she received the communication and sent the corresponding response. For instance, operations that are contextually related to a response may include operations that cause a computing device to provide directions to a location indicated in the received communication and/or the response, operations that cause the computing device to create, modify, or delete a calendar item corresponding to an event in the received communication or response, and operations that cause the computing device to provide other information about a subject or subjects (e.g., a location, a person, an item, an event, etc.) of the received communication and/or the response. Further examples of operations that are contextually related to a response may include operations that cause a computing device to initiate a phone call, create a reservation for a restaurant, a rental car, an airline flight, or hotel, operations that cause the computing device to execute a search for items on one or more networks (e.g., the Internet) or websites (e.g., auction websites, social network service websites, etc.).

Application module 10A may receive an indication of input 29 to select response option 28A and may send an indication of the corresponding candidate response to communication action module 12. Responsive to receiving an indication of a selected response, communication action module 12 may, in some examples, determine one or more subjects of the selected response. For instance, communication action module 12 may perform text analysis and/or natural language processing techniques on the selected response to determine the subject or subjects of the communication and/or determine other factors. That is, in some examples, communication action module 12 may determine the subject matter of both the received communication and the response to the received communication in order to determine an operation contextually related to the response.

In some examples, communication action module 12 may additionally or alternatively determine and/or update the context of computing device 2 in response to receiving the indication of the selected response. For instance, communication action module 12 may determine whether any contextual information about computing device 2 and/or the user of computing device 2 (e.g., the location of computing device 2, the social network service account of the user, etc.) has changed and, if any information has changed, communication action module 12 may update the contextual information accordingly.

In some examples, communication action module 12 may determine an operation that is contextually related to a selected candidate response by predicting one or more operations that a user would likely cause a computing device to perform, given one or more of the determined subject or subjects of the received communication, the determined subject or subjects of the selected candidate response, and/or the obtained contextual information. For instance, communication action module 12 may determine operations that were previously performed by computing device 2 and/or other computing devices in contexts that were similar to a presently determined context of the computing device 2. That is, communication action module 12 may determine contextually related operations based on previous operations performed by computing devices in a similar context after receiving a similar communication and receiving input from a user to cause the computing device to generate and/or send a similar response.

In other examples, communication action module 12 may determine an operation that is contextually related to a selected candidate response in various other ways. For instance, communication action module 12 may employ a lookup table that provides associations between information in the communications and contextually related operations. That is, communication action module 12 may search the received communication and/or the selected candidate response for one or more words and/or one or more punctuation marks. If the communications include words, punctuation marks, or a combination thereof that exist in the lookup table, communication action module 12 may determine the corresponding operation. As one example, if the received communication and/or the selected candidate response include the word "weather," communication action module 12 may determine an operation to output weather information for display (e.g., at UI device 4). In other words, while described in some examples as predicting operations that are contextually related to a selected candidate response, communication action module 12 may determine contextually related operations in any number of ways, such as obtaining stored operations using a lookup table, predicting contextually related operations based on text analysis, or other ways.

Communication action module 12 may, in the example of FIG. 1, receive the indication of the selected response, "On my way," and determine an operation that is related to the selected response. For instance, communication action module 12 may predict an operation that the user of computing device 2 may cause computing device 2 to perform responsive to the user receiving the SMS message "We're all at Yotteru Sushi Restaurant" and selecting the response "On my way." That is, communication action module 12 may determine a subject or subjects of the selected response and, based on the subject(s) of the selected response, the subject(s) of the received communication and/or the contextual information, communication action module 12 may determine that the user of computing device 2 is likely going to travel to a location indicated in the received communication. Furthermore, communication action module 12 may determine that it is unlikely that the user has travelled to the location recently, and thus it is likely that the user will provide input to cause computing device 2 to provide directions to the location. Therefore, communication action module 12 may determine an operation to provide directions to the location.

In some examples, communication action module 12 may determine what application modules are installed at computing device 2 (e.g., as part of determining the operation that is contextually related to the selected response or at some earlier point in time that is not based on determining the operation). That is, communication action module 12 may, in some examples, determine what application modules are available at computing device 2 to perform determined operations. In some examples, communication action module 12 may determine more likely operations that can be performed by application modules 10, and determine less likely operations, e.g., operations that cannot be performed by application modules 10. For instance, if a maps application is not included in application modules 10, communication action module 12 may, in some examples, determine a contextually related operation to cause a maps application to provide directions to be less likely. In some examples, communication action module 12 may determine operations without regard to what application modules are installed at computing device 2. In some examples, contextually related operations determined by communication action module 12 may be or may include operations to obtain relevant applications (e.g., from an application store or other source). For instance, if communication action module 12 determines that an operation to create a reservation at a restaurant is more likely, but application modules 10 does not include any application configured to create such reservations, communication action module 12 may also determine that an operation to obtain (e.g., after obtaining permission from the user) an application module capable of creating the reservation is more likely.

In the example of FIG. 1, computing device 2 may execute the operation. For instance, communication action module 12 may cause computing device 2 to perform the determined operation by executing a call of an application programming interface (API) of one of application modules 10. In the example of FIG. 1, communication action module 12 may determine an operation to provide directions to Yotteru Sushi Restaurant. Communication action module 12 may use an API to call one of application modules 10 (e.g., application module 10B) to provide directions (e.g., in a turn-by-turn mode or otherwise) to the Yotteru Sushi Restaurant location. That is, in the example of FIG. 1, communication action module 12 may perform an API call to application module 10B to cause computing device 2 to provide directions to Yotteru Sushi Restaurant.

In some examples, computing device 2 may perform contextually related operations without outputting information for display and/or without any further user interaction. For instance, in some examples, a calendar application of computing device 2 may perform a contextually related operation to create a calendar item without indicating to the user that the operation is being performed, without prompting the user to cancel or allow the operation, and/or without displaying any information about the created item to the user.

In some examples, computing device 2 may display additional information and/or prompt the user for acceptance as part of performing the operation or prior to performing the operation. For instance, in the example of FIG. 1, application module 10B may send data to UI module 6 to cause UI device 4 to output GUI 30. As shown in the example of FIG. 1, GUI 30 may indicate to the user of computing device 2 that computing device 2 is performing or about to perform the contextually related operation. GUI 30 includes user selectable elements that may enable the user to modify or cancel the operation, such as elements 34A and 34B. In some examples, if computing device 2 does not receive an indication of input that selects one of elements 34A or 34B within a threshold amount of time (e.g., 1 second, 2 seconds, or other duration), computing device 2 (e.g., application module 10B) may perform the operation. That is, application module 10B may provide directions to Yotteru Sushi Restaurant (e.g., by causing UI device 4 to output a map, turn-by-turn text directions, etc.).

In some examples, GUI 30 may additionally or alternatively provide a user selectable element to affirmatively cause computing device 2 to perform the operation. That is, in some examples computing device 2 may provide a confirmation dialogue which the user may accept or reject. Such a confirmation dialogue may be useful in instances where the operation was determined to be only slightly contextually related to the correspondence, or where the operation may have a large impact on the user (e.g., removing a scheduled calendar event, placing a phone call, purchasing an application or other product, etc.).

By providing candidate responses and automatically performing an operation contextually related to a received communication and a selected response to the received communication, techniques of the present disclosure may reduce the amount of time required for a user of computing device 2 to input a response to a received communication and/or to perform other operations based on the correspondence. For instance, wearable computing devices, such as watches or other devices, may be able to display candidate responses to a user that are based on a received communication and automatically perform contextually related operations, thereby enabling the user to quickly tap or otherwise select one of the candidate responses instead of having to use voice recognition or other means to input a response and cause the device to perform related operations.

Figure 2:
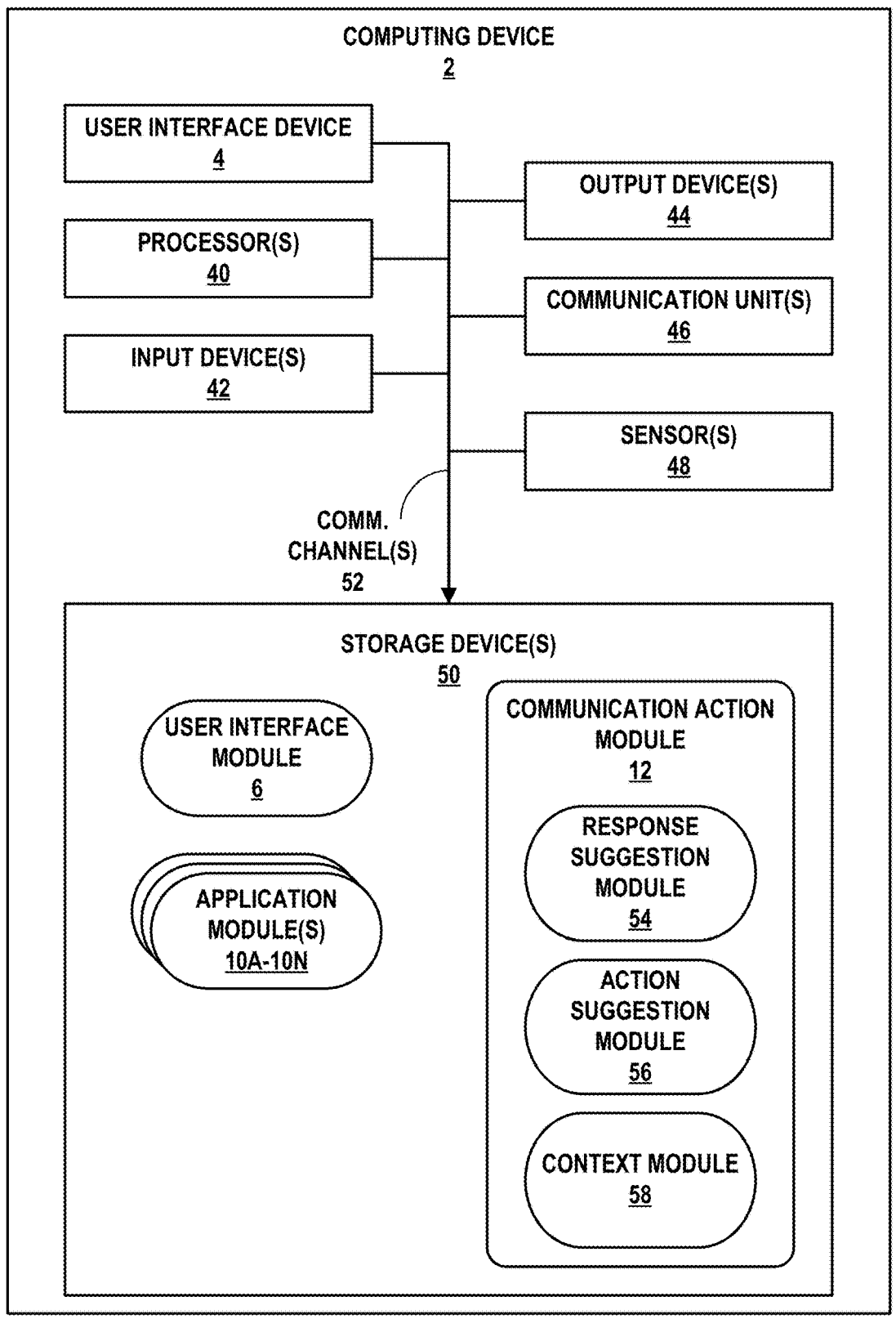
FIG. 2 is a block diagram illustrating details of one example of a computing device for performing contextually related operations responsive to sending a response to a received communication, in accordance with one or more techniques of the present disclosure.

FIG. 2 is a block diagram illustrating details of one example of a computing device for performing contextually related operations responsive to sending a response to a received communication, in accordance with one or more techniques of the present disclosure. FIG. 2 is described below within the context of FIG. 1. FIG. 2 illustrates only one particular example of computing device 2, and many other example devices having more, fewer, or different components may also be configurable to perform operations in accordance with techniques of the present disclosure.

While displayed as part of a single device in the example of FIG. 2, components of computing device 2 may, in some examples, be located within and/or part of different devices. For instance, in some examples, some or all of the functionality of communication action module 14 may be located at a server system or other computing device (e.g., accessible by computing device 2 via a network). That is, in some examples, techniques of the present disclosure may be performed and utilized by a single computing device while in other examples the techniques may be performed and/or utilized at a remote computing system, such as a distributed or "cloud" computing system. In some such examples, computing device 2 may receive a communication and determine candidate responses by providing at least a portion of the received communication to a remote device (e.g., a server system) and receiving a response that includes the candidate responses. Responsive to receiving a selection of one of the candidate responses, computing device 2 may determine an operation contextually related to the candidate response by sending at least an indication of the selected candidate response to a remote device and receiving a response that includes instructions that are executable to perform the operation.

In some examples, computing device 2 may represent a wearable computing device. A wearable computing device may be any computing device wearable or otherwise attachable to a user, such as a smartwatch, a head-mounted computing device (e.g., a computing device incorporated into glasses, a hat, earphones, a contact lens or other like items), implantable devices, or any other device a user may attach to his or her person. Some wearable computing devices, such as a smartwatch, may include one or more input devices to receive various types of input from a user, one or more output devices to provide audio, visual, tactile, or other output to the user, one or more network interfaces to communicate with other computing devices, one or more sensors to obtain information, and/or other components.

In some examples, a wearable device may communicate with a mobile device (e.g., a smartphone) or other device to perform some operations. For instance, in some examples, part of the techniques of the present disclosure may be performed by a smartwatch, while part may be performed by one or more other computing devices (e.g., a smartphone that is wirelessly linked with the smartwatch, a server device with which the smartphone may communicate, or other devices). In other words, while described herein as being performed by one or more components of computing device 2, some of the components configurable to determine candidate responses and/or contextually related operations may be distributed among a plurality of computing devices in accordance with the techniques described herein.

As shown in the example of FIG. 2, computing device 2 includes user interface (UI) device 4, one or more processors 40, one or more input devices 42, one or more output devices 44, one or more communications units 46, one or more sensors 48 and one or more storage devices 50. Storage devices 50 further include user interface (UI) module 6, suggestion module 12, application modules 10, and communication action module 14. Communication action module 14, in the example of FIG. 2, includes response suggestion module 54, action prediction module 56, and context module 58.

Each of components 4, 40, 42, 44, 46, 48, and 50 may be interconnected (physically, communicatively, and/or operatively) for inter-component communications. In the example of FIG. 2, components 4, 40, 42, 44, 46, 48, and 50 may be coupled by one or more communications channels (COMM. CHANNELS) 52. In some examples, communications channels 52 may include a system bus, network connection, inter-process communication data structure, or any other channel for communicating data. Modules 6, 10, 12, 54, 56, and 58 may also communicate information with one another as well as with other components in computing device 2.

In the example of FIG. 2, one or more input devices 42 may be operable to receive input. Examples of input are tactile, audio, and video input. Input devices 42, in one example, include a presence-sensitive or touch-sensitive display, a mouse, a keyboard, a voice responsive system, a video camera, a microphone or other audio sensor, or any other type of device for detecting input from a human or machine.

One or more output devices 44 may be operable, in the example of FIG. 2, to generate output. Examples of output are tactile, audio, and video output. Output devices 44 of computing device 2, in some examples, include a presence-sensitive display, sound card, video graphics adapter card, speaker, cathode ray tube (CRT) monitor, liquid crystal display (LCD), or any other type of device for generating output to a human or machine.

In some examples, UI device 4 may include functionality of input devices 42 and/or output devices 44. In the example of FIG. 2, for instance, UI device 4 may be or may include a presence-sensitive input device. In some examples, a presence-sensitive input device may detect an object at and/or near the presence-sensitive input device. As one example range, a presence-sensitive input device may detect an object, such as a finger or stylus that is within two inches or less of the presence-sensitive input device. In another example range, a presence-sensitive input device may detect an object six inches or less from the presence-sensitive input device, and other ranges are also possible. The presence-sensitive input device may determine a location (e.g., an (x,y) coordinate) of the presence-sensitive input device at which the object was detected. The presence-sensitive input device may determine the location selected by the input device using capacitive, inductive, and/or optical recognition techniques. In some examples, presence-sensitive input device provides output to a user using tactile, audio, or video stimuli as described with respect to output devices 44, and may be referred to as a presence-sensitive display.

While illustrated as an internal component of computing device 2, UI device 4 may also represent an external component that shares a data path with computing device 2 for transmitting and/or receiving input and output. That is, in some examples, UI device 4 may represent a built-in component of computing device 2, located within and physically connected to the external packaging of computing device 2 (e.g., a screen on a mobile phone or wearable computing device). In some examples, UI device 4 may represent an external component of computing device 2, located outside and physically separated from the packaging of computing device 2 (e.g., a monitor, a projector, or other display device that shares a wired and/or wireless data path with computing device 2).

In the example of FIG. 2, one or more communication units 46 may be operable to communicate with external devices via one or more networks by transmitting and/or receiving network signals on the one or more networks. For example, computing device 2 may use communication units 46 to transmit and/or receive radio signals on a radio network such as a cellular radio network. Likewise, communication units 46 may transmit and/or receive satellite signals on a satellite network such as a GPS network. Examples of communication unit 46 include a network interface card (e.g. such as an Ethernet card), an optical transceiver, a radio frequency transceiver, or any other type of device that can send and/or receive information. Other examples of communication units 46 may include Near-Field Communications (NFC) units, Bluetooth® radios, short wave radios, cellular data radios, wireless network (e.g., Wi-Fi®) radios, as well as universal serial bus (USB) controllers.

One or more sensors 48 may, in the example of FIG. 2, be operable to generate data for use by components of computing device 2. Sensors 48 may include any device or component capable of obtaining data about computing device 2, data about an environment in which computing device 2 is situated, data about a user of computing device 2, or other data. That is, any of sensors 48 may be hardware, firmware, software, or a combination thereof for obtaining information. Examples of sensors 48 may include a GPS sensor or GPS radio, a position sensor, an accelerometer or other motion sensor, a camera, a compass, a magnetometer, a light sensor, an infrared sensor, a microphone or other audio sensor, a radiation sensor, a temperature sensor, a barometer, an altimeter, or other data gathering components.

One or more storage devices 50 may be operable, in the example of FIG. 2, to store information for processing during operation of computing device 2. In some examples, storage devices 50 may represent temporary memory, meaning that a primary purpose of storage devices 50 is not long-term storage. For instance, storage devices 50 of computing device 2 may be volatile memory, configured for short-term storage of information, and therefore not retain stored contents if powered off. Examples of volatile memories include random access memories (RAM), dynamic random access memories (DRAM), static random access memories (SRAM), and other forms of volatile memories known in the art.

Storage devices 50, in some examples, also represent one or more computer-readable storage media. That is, storage devices 50 may be configured to store larger amounts of information than a temporary memory. For instance, storage devices 50 may include non-volatile memory that retains information through power on/off cycles. Examples of non-volatile memories include magnetic hard discs, optical discs, floppy discs, flash memories, or forms of electrically programmable memories (EPROM) or electrically erasable and programmable (EEPROM) memories. In any case, storage devices 50 may, in the example of FIG. 2, store program instructions and/or data associated with modules 6, 10, 12, 54, 56, and 58.

In the example of FIG. 2, one or more processors 40 may be configured to implement functionality and/or execute instructions within computing device 2. For example, processors 40 may be operable to receive and execute instructions stored at storage devices 50 that implement the functionality of UI module 6, application modules 10, suggestion module 12, response suggestion module 54, action prediction module 56, and context module 58. These instructions, executed by processors 40, may cause computing device 2 to store information within storage devices 50 (e.g., temporary memories) during program execution. Processors 40 may execute instructions of modules 6, 10, 12, 54, 56, and 58 to cause UI device 4 to output candidate responses in response to computing device 2 receiving a communication. Furthermore, processors 40 may execute the instructions of modules 6, 10, 12, 54, 56, and 58 to determine an operation that is contextually related to a response communication. That is, modules 6, 10, 12, 54, 56, and 58 may be operable by processors 40 to perform various actions, including predicting candidate responses to a received communication and predicting one or more operations based on the received communication and a selected response communication.

Computing device 2 may, in the example of FIG. 2, receive a communication. For instance, one of communication units 46 may receive data from a network (e.g., a wireless network or cellular network) adhering to the SMS protocol and representing a text message. Communications units 46 may provide the received data to one or more of application modules 10 that are designated (e.g., previously designated by a user) to handle data adhering to the SMS protocol, such as application module 10A.

Application module 10A may receive the text message and cause computing device 2 to output at least an indication of the text message. For instance, application module 10A may send information to UI module 6 that causes UI device 4 or any of output devices 44 to display a visual representation of the text (e.g., "We're all at Yotteru Sushi Restaurant.") included in the text message. The user of computing device 2 may view the output and provide input that instructs computing device 2 to respond to the text message. That is, UI module 6 may receive an indication of input, performed at UI device 4 or any of input devices 42 that selects an option to respond to the received text message. UI module 6 may provide the indication of input to application module 10A.

Responsive to receiving the input to instruct computing device 2 to respond to the text message, application module 10A may request candidate responses from communication action module 12. In requesting candidate responses, application module 10A may provide information that was included in the text message (e.g., the text "We're all at Yotteru Sushi Restaurant.") and/or other information (e.g., an indication of the sender of the text message). That is, a request for candidate responses, in various examples, may include information that was included in a received email, a received text message, a received application notification, a received calendar invite, a reminder, or other communication. In some examples, the request for candidate responses may include all of the information included in the received communication. That is, the request may include the entire email, text message, etc. In other examples, the request may include a portion of information. For instance, the request may include a date and time indicated in the received communication, an indicated location, the names of participants in a meeting, emoji, a picture, or other information. Communication action module 12 may receive the request for candidate responses and provide the request to response suggestion module 54.

Response suggestion module 54 may be operable to receive a request for candidate responses and determine one or more candidate responses to a communication. In some examples, response suggestion module 54 may be operable to determine candidate responses by using natural language processing or other techniques to parse the received communication, determine semantic meaning and/or one or more semantic elements, and predict candidate responses that a user may be likely to select as a response to the received communication. For instance, response suggestion module 54 may parse text to obtain important phrases and distill key ideas (e.g., semantic elements). For instance, response suggestion module 54 may implement computer learning techniques trained from various corpora sources. That is, response suggestion module 54 may predict candidate responses by using data that was previously learned from parsing large volumes of text including indications (provided by humans) of different parts of speech, indications of key ideas, indications of types of speech, and other indications. Response suggestion module 54 may learn from these corpora and apply the results to text input. For instance, response suggestion module 54 may determine various parts of speech (e.g., subject, object, verb, noun, noun phrase, etc.) for the text input and determine subjects or items having values within a conceptual data space (e.g., a semantic space) for the input. The semantic elements may be topics or subjects that may be mentioned in, referred to, described in, or otherwise present in the input. In some examples, response suggestion module 54 may determine semantic elements using clustering. While described with respect to response suggestion module 54, one or more of the aforementioned techniques may be performed at one or more remote computing devices other than computing device 2.

After determining semantic elements for some text input (e.g., a communication), response suggestion module 54 may use natural language processing techniques to determine one or more responses that a user might be likely to select. In some examples, response suggestion module 54 may determine the responses based on previous responses selected by the user and/or other users. That is, response suggestion module 54 may use various statistics to determine word choice, phrase construction, and other factors relevant to creating candidate responses. By condensing received communications to semantic elements (e.g., one or more subjects), response suggestion module 54 may determine a semantic meaning of the communication (e.g., what the communication is about). In some examples, response suggestion module 54 may weigh semantic elements by importance (e.g., based on predetermined importance values, based on frequency of occurrence in a communication, and/or other factors). By analyzing previous responses to communications having substantially similar semantic meanings (e.g., similar important subjects), response suggestion module 54 may increase the likelihood that the predicted candidate responses will be relevant to the received communication. Two semantic meanings may, in various examples, be substantially similar if they have a threshold number (e.g., one, three, five, or other number) of semantic elements that are the same, if they have a threshold percentage (e.g., twenty percent, fifty percent, or other percentage) of semantic elements the same, if one semantic meaning has a threshold number of semantic elements that exist in the other semantic meaning, if the semantic meanings are probabilistically similar, or if some other criteria are satisfied.

In the example of FIG. 2, response suggestion module 54 might determine, based on the received communication, that the sender of the communication is at a place called Yotteru Sushi Restaurant with one or more other people. Based on previous responses provided by the user of computing device 2 and/or other users, response suggestion module 54 may predict responses that the user might select, such as responses to indicate that the user plans to join, responses to query where the location is, or other responses. In other words, response suggestion module 54 may, in some examples, use various machine learning techniques such as natural language processing to parse communications and determine candidate responses.

In some examples, response suggestion module 54 may be operable to determine candidate responses to the received communication by using one or more words and/or punctuation marks from the communication as input for one or more lookup tables. For instance, response suggestion module 54 may determine a type of communication by searching a lookup table (e.g., a communication type lookup table) for the first word in each sentence and the corresponding punctuation mark at the end of the sentence. The communication type lookup table may include entries that indicate a type of communication for various combinations, such as a "location request" type that corresponds to the combination of "where" and a question mark character, a "time request" type that corresponds to the combination of "when" and question mark character, a "confirmation request" type that corresponds to the combination of "want" and question mark character, a "status update" type that corresponds to "we" (or "we're," or "I," or "I'm") and a period character (or no punctuation), etc. Thus, for the text message, "We're all at Yotteru Sushi Restaurant." response suggestion module 54 may determine a "status update" type.

Response suggestion module 54 may also determine one or more subjects of the received communication by using words or word combinations to search a lookup table (e.g., a subject matter lookup table) that defines certain types of subjects, such as locations, people, objects or items, or other types. If a word is included in the subject matter lookup table, the word may be a subject of the corresponding type. For instance, if "Restaurant" or "Yotteru Sushi Restaurant" is included in the subject matter lookup table, it may correspond to a "location" type and/or an "item" type. That is, a restaurant may correspond to a specific location, a specific item (e.g., the restaurant itself), or both.

In some examples, response suggestion module 54 may determine candidate responses based on the determined communication type, the determined subject type, and the subject itself. For instance, response suggestion module 54 may access another lookup table (e.g., a response lookup table) using these values as input to receive one or more candidate responses as output. In the example of FIG. 2, the response lookup table may include an entry for a "status update" type with a "location" type subject and a subject of "Yotteru Sushi Restaurant." The entry may correspond to stored candidate responses such as "On my way," "I can't make it," "Sounds like fun," or other candidate responses. In various examples, response suggestion module 54 may use more or fewer tables in a similar fashion to determine candidate responses. That is, while described in the example of FIG. 2 as a communication type lookup table, a subject matter lookup table and a response lookup table, techniques of the present disclosure may, in other examples, utilize any number of lookup tables providing additional or other specificity. After determining candidate responses, response suggestion module 54 may provide the candidate responses to application module 10A.

In the example of FIG. 2, application module 10A may receive the candidate responses and send data to UI module 6 to cause UI device 4 or one or more of output devices 46 to display a representation of the candidate responses. The user of computing device 2 may view the displayed responses and provide input that selects one of the candidate responses or inputs a custom response. That is, UI module 6 may receive an indication of input, performed at UI device 4 or any of input devices 42 that selects a response option representing a candidate response or that inputs a custom response. UI module 6 may provide the indication of input to application module 10A.

Application module 10A may receive the indication of input that selects a response and, responsive to receiving the indication, may send the selected response. For instance, in the example of FIG. 2, application 10A may receive an indication of input to select the candidate response "On my way" and may send the selected candidate response (e.g., to the sender of the received communication).

In the example of FIG. 2, application module 10A may send an indication of the selected candidate response to communication action module 12. Communication action module 12 may provide the indication of the candidate response to action suggestion module 56 for determination of one or more operations that are contextually related to the candidate response, based at least in part on at least one of the received communication and the candidate response. That is, action suggestion module 56 may be operable to determine at least one operation that is relevant to the context of the selected candidate response based at least in part on the communications.

In some examples, action suggestion module 56 may predict contextually related operations based on computer learning techniques and/or natural language processing of the received communication and candidate response. For instance, action suggestion module 56 may parse the selected candidate response to determine a semantic meaning for the candidate response (e.g., what the selected candidate response is about). Along with the information indicating the semantic meaning of the received communication, action suggestion module 56 may use the semantic meaning of the selected candidate response to predict an operation that the user may be likely to cause computing device 2 to perform when computing device 2 has received communications and sent responses that were associated with substantially similar semantic meanings. For instance, action suggestion module 56 may determine previous correspondences (e.g., previously received communications and previously sent responses) that were associated with a group of semantic elements that included a threshold number of semantic elements existent in a group of semantic elements associated with the selected candidate response and/or the received communication. Action suggestion module 56 may determine operations that were performed within a threshold amount of time after the determined previous correspondences. For instance, action suggestion module 56 may determine operations that were performed immediately after the previous correspondence, within 2 minutes of the correspondence, within 5 minutes, or otherwise performed at a similar time. That is, in some examples, action suggestion module 56 may predict contextually related operations by learning what operations computing devices (e.g., computing device 2 and/or other computing devices) have previously performed, given substantially similar previously received communications and corresponding responses.

In the example of FIG. 2, for instance, computing devices that received a status update message indicating a location and sent a response that indicated the user intends to travel to the location may have received input that caused the computing device to provide directions to the location. Based on this correlation, action suggestion module 56 may determine an operation to obtain driving directions to Yotteru Sushi Restaurant.

In some examples, action suggestion module 56 may determine contextually related operations using other methods. For instance, action suggestion module 56 may parse the selected candidate response using one or more lookup tables to determine a response type, and a subject type. Action suggestion module 56 may then use the communication type, subject, and/or subject type for the received communication, along with the response type, subject, and/or subject type of the selected candidate response to look up a corresponding operation that is contextually related to the candidate response.

In some examples, action suggestion module 56 may parse the selected candidate response and/or the received communication and determine a plurality of operations based on one or more semantic elements included in the communications. A semantic element, generally, may be any specified sequence of symbols or combinations of symbols that have meaning in a spoken and/or written language. Examples of semantic elements may include one or more words (e.g., a noun, a noun phrase, a verb, a verb phrase, etc.), one or more numbers or number groups, one or more emoticons, or a combination of such items. Action suggestion module 56 may determine operations by searching the received communication and/or the selected candidate response for semantic elements associated with operations. If the communications contain any semantic element associated with a particular operation, action suggestion module 56 may include the particular operation in the plurality of operations. Action suggestion module 56 may determine respective scores associated with each of the plurality of operations. For instance, a respective score for a particular operation may indicate the number of semantic elements included in (or otherwise associated with) the communications that are also associated with the particular operation. That is, action suggestion module 56 may compare each semantic element included in the communications with each semantic element associated with the operation. If the semantic elements are the same (or at least substantially similar), action suggestion module 56 may increment the corresponding score. Two semantic elements may be substantially similar if the elements are the same, or if the elements are probabilistically within a degree of similarity that is greater than a threshold value. Action suggestion module 56 may then select, as the operation that is contextually related to the candidate response, the operation associated with the best respective score. In other words, action suggestion module 56 may, in some examples, use groups of semantic elements associated with operations to determine which operation has the most semantic elements in common with the communications.

In some examples, action suggestion module 56 may determine the operation that is contextually related to the selected candidate response by parsing the selected candidate response to determine a semantic meaning of the candidate response. Action suggestion module 56 may use the semantic meaning of the candidate response and/or the semantic meaning of the received communication to determine one of application modules 10 that is registered to handle information associated with the determined semantic meaning or meanings. An application module may be registered to handle information associated with a semantic meaning by an operating system of the computing device, a user of the computing device, an administrator of the computing device, or registered in some other way. The registered application module may be operable to receive information associated with the semantic meaning (e.g., information of a specific type, information about specific topics, etc.) and act on the information. For instance, action suggestion module 56 may determine that the semantic meaning of the received communication and/or the selected candidate response is a contact of the user of computing device 2 by the name of "George." Action suggestion module 56 may determine that the application registered to handle contacts is an address book application. Based on the determination of the registered application, action suggestion module 56 may determine an operation to cause the registered application to execute on information included in at least one of the received communication and/or the selected candidate response. For instance, action suggestion module 56 may determine an operation to cause the address book application to execute with the information "George" (e.g., which may cause the address book application to search for contacts name George).

In the example of FIG. 2, action suggestion module 56 may execute the determined operation. For instance, action suggestion module 56 may use an API call of one of application modules 10 (e.g., a maps application or navigation application) and include an indication of the location (e.g., Yotteru Sushi Restaurant) to cause computing device 2 to execute the operation and provide directions to Yotteru Sushi Restaurant. Action suggestion module 56 and/or application modules 10 may provide data to UI module 6 that causes UI 4 or one or more of output devices 44 to output the information for display.

In some examples, determining candidate responses and/or determining contextually related operations may be based additionally or alternatively on contextual information that defines a current context of computing device 2 and/or a current context of a user of computing device 2 (e.g., as defined by items of contextual information). That is, in some examples, response suggestion module 54 may determine candidate responses based on the current context of computing device 2 and/or the user. Furthermore, action suggestion module 56 may, in some examples, determine operations that are contextually related to the candidate response based on the current context of computing device 2 and/or the user. Response suggestion module 54 and/or action suggestion module 56 may communicate with context module 58 to obtain contextual information that defines the current context.

Context module 58 may be operable to obtain contextual information for use in determining candidate responses and/or contextually related operations. The information may include contextual information about computing device 2. For instance, context module 58 may obtain items of information representing one or more locations of computing device 2, information indicating a time and/or time zone setting of computing device 2, information indicating movement of computing device 2, an ambient noise level of the environment around computing device 2, an ambient light level of the environment, or other sensor data (e.g., obtained from sensors 48). Additional examples of items of contextual information may include information indicating one or more applications currently being executed by computing device 2 and/or an activity in which a currently executing application is engaging, information indicating the type of the received communication (e.g., email, text message, calendar alert, or other type), information indicating the type of response that the computing device will be sending, information indicating the time at which the communication was received, information indicating previous communications to or from the sender, information indicating an occupation of the user, information indicating an activity in which the user is currently engaged, information indicating the sender of the received communication, or information indicating one or more recipients of the response that the computing device will be sending.

In some examples, context module 58 may additionally or alternatively obtain items of contextual information about a user of computing device 2. For instance, context module 58 may obtain contextual information about the user from an email account associated with a user, a social network service account of the user, a web search history associated with the user, a location history associated with the user, or any other source. That is, in some examples, context module 58 may obtain any information usable by one or more components of communication action module 12 to determine more accurate candidate responses and/or more accurate operations that are contextually related to candidate responses.

Context module 58 may only obtain contextual information about computing device 2 and/or a user of computing device 2 if the user provides explicit permission. That is, context module 58 may only obtain various sources of information for predicting candidate responses and/or contextual operations if a user of computing device 2 explicitly allows communication action module 12 to access various sources of contextual information. For instance, computing device 2 may prompt the user to allow access to sources of contextual information such as sensors 48, an email account of the user, a social network service account, or other account. If the user explicitly agrees to allow access, one or more components of communication action module 12 may obtain the contextual information and use the contextual information in determining candidate responses and/or determining contextually related operations.

In the example of FIG. 2, context module 58 may obtain contextual information (e.g., from one of sensors 48) indicating that computing device 2 is currently at Location X. Context module 58 may also obtain contextual information (e.g., from a maps application) indicating a plurality of locations of Yotteru Sushi Restaurant. That is, context module 58 may obtain information indicating a location of computing device 2 and information indicating locations of Yotteru Sushi.

In some examples, context module 58 may be operable to determine a current context of computing device 2 based on obtained items of contextual information. For instance, context module 58 may define a current context as a collection of all obtained items of contextual information. In another example, contextual module 58 may define a current context by determining weights for various items of contextual information. Context module 58 may weigh each item of contextual information based on a predicted accuracy and/or a predicted importance of the item. In the example of FIG. 2, context module 58 may weigh the contextual information indicating Location X very heavily because the location of computing device 2 is likely to be very accurate. Context module 58 may weigh the contextual information indicating each of the locations of Yotteru Sushi Restaurant lighter, because the text "Yotteru Sushi Restaurant" is a general location identifier and it is not certain which of the restaurant locations the received communication was referring to. By determining the current context, context module 58 may allow response suggestion module 54 and/or action suggestion module 56 to determine more accurate candidate responses that are more likely to be selected by a user and/or more closely related operations. For instance, response suggestion module 54 may, in the example of FIG. 2, use the determined current context to determine the candidate response "The one on Washington St.?" That is, response suggestion module 54 may receive the context from context module 58 including contextual information that indicates the multiple locations of Yotteru Sushi Restaurant and the associated weights. Because each restaurant is weighted approximately the same, response suggestion module may determine that it is not certain which of the Yotteru Sushi Restaurants the received communication is referring to.

In various examples, response suggestion module 54 may use the determined current context in addition to or instead of other information (e.g., information included in a received communication, metadata about the received communication, etc.) to determine candidate responses. That is, in accordance with the techniques described herein, response suggestion module 54 may, in some examples, determine one or more candidate responses that are associated with a semantic meaning that is similar to the semantic meaning of the received communication (e.g., based on the natural language processing of previously received communications, previously selected candidate responses, and/or previously input custom responses). Response suggestion module 54 may, in some examples, rank the determined candidate responses by their contextual similarity to the current context of computing device 2. Contextual similarity may be a measure of how many items of contextual information are the same between two contexts. For instance, a candidate response may be associated with a context that is substantially similar to the current context if one of the contexts includes a threshold number (e.g., one, three, five, or other number) of items of contextual information that exist in the other context. Other examples of determining substantial similarity between contexts include determining whether the contexts each include a threshold percentage of items of contextual information that are the same (e.g., twenty percent, fifty percent, or other percentage), or other methods of measuring the contextual similarity.

Response suggestion module 54 may output the determined candidate responses that are associated with contexts or items of contextual information that are the most similar to the current context or the current items of contextual information. For instance, response suggestion module 54 may score the determined candidate responses based on the number of items of contextual information that are the same as items of contextual information included in the current context. Response suggestion module 54 may then output the determined candidate responses that are associated with the highest scores. In some examples, response suggestion module 54 may output the top responses (e.g., the top three, the top five, etc.). In some examples, response suggestion module 54 may output responses associated with scores that are above a threshold score.

Furthermore, action suggestion module 56 may, in various examples, use the determined current context in addition to or instead of other information (e.g., information included in the communications, metadata, other communications, etc.) to determine contextually related operations. That is, in accordance with the techniques described herein, action suggestion module 56 may determine one or more operations that are associated with a semantic meaning that is similar to the semantic meaning that is associated with the received communication and/or the selected candidate response (e.g., based on natural language processing of previously received communications, previously selected responses, and/or previous operations). In some examples, action suggestion module 56 may rank the determined operations by their contextual similarity to the current context of computing device 2. Action suggestion module 56 may output the determined operations that are associated with contexts or items of contextual information that are the most similar to the current context or the current items of contextual information. For instance, action suggestion module 56 may score the determined operations based on the number of items of contextual information that are the same as items of contextual information included in the current context. Action suggestion module 56 may then output the determined operations that are associated with the highest score or scores. In some examples, action suggestion module 56 may output the top operations (e.g., the top operation, the top three operations, etc.). In some examples, action suggestion module 56 may output operations associated with scores that are above a threshold score.

Figure 3:
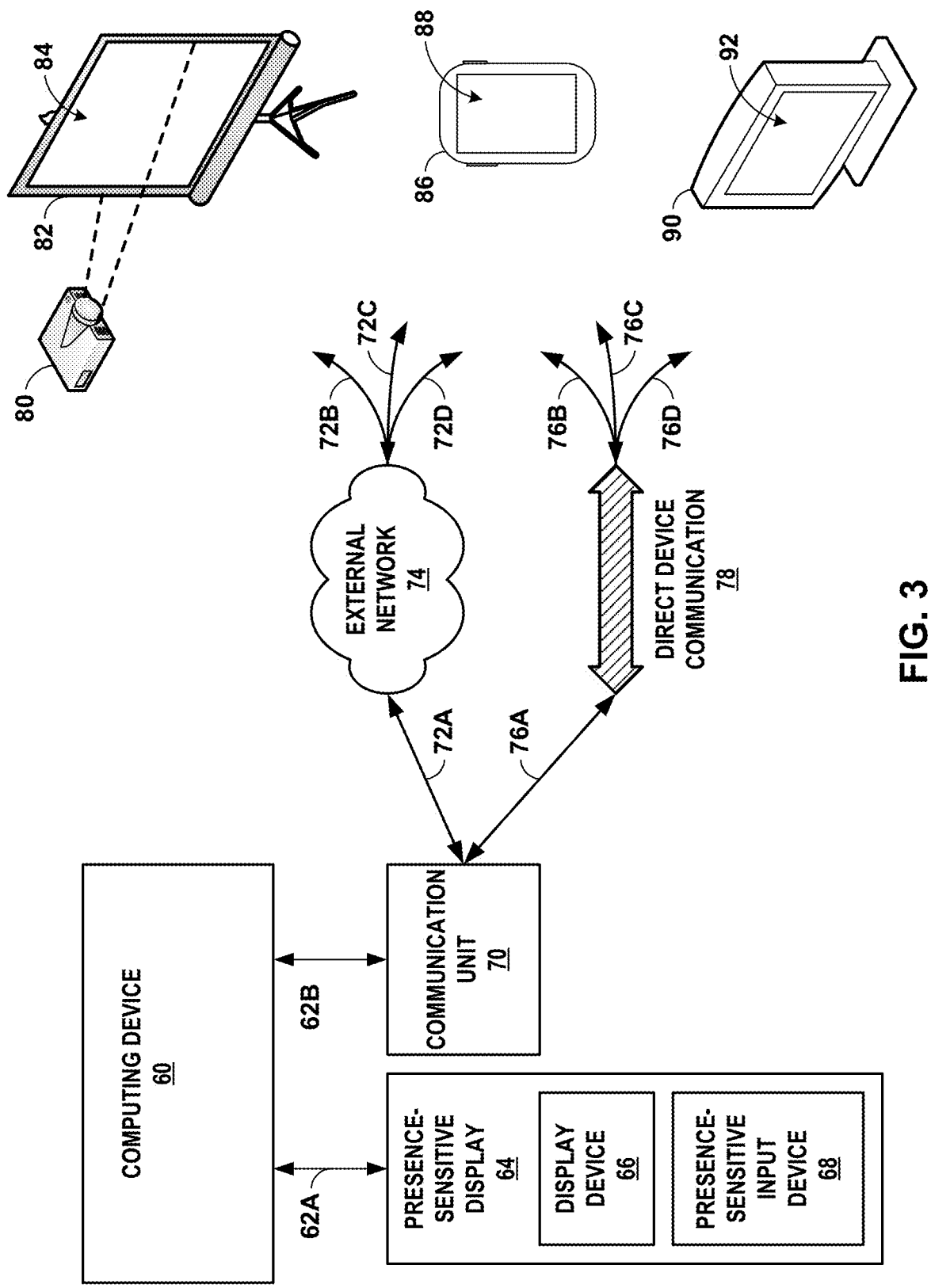
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a stand-alone computing device 2, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processors 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 2 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, mainframe, etc.

Presence-sensitive display 64, as one of input devices 42 and/or output devices 44 as shown in FIG. 2, may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed. In other examples, presence-sensitive input device 68 may be positioned physically apart from display device 66, and locations of presence-sensitive input device 68 may correspond to locations of display device 66, such that input can be made at presence-sensitive input device 68 for interacting with graphical elements displayed at corresponding locations of display device 66.

As shown in FIG. 3, computing device 60 may also include and/or be operatively coupled with communication unit 70. Communication unit 70 may include functionality of communication units 42 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures, etc.) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of input devices 4 and/or output devices 6 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures, etc.) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88, 92 may include a subset of functionality or all of the functionality of input devices 42 and/or output devices 44 as described in this disclosure. In some examples, presence-sensitive displays 88, 92 may include additional functionality. In any case, presence-sensitive display 92, for example, may receive data from computing device 60 and display the graphical content. In some examples, presence-sensitive display 92 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, and 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, WiFi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with techniques of the disclosure, computing device 60 may be operatively coupled to visual display device 90 using external network 74. Computing device 60 may output graphical content for display at presence-sensitive display 92. For instance, computing device 60 may send data that includes a GUI for one or more of application modules 10 to communication unit 70. Communication unit 70 may send the data that includes the GUI to visual display device 90 using external network 74. Visual display device 90, in response to receiving the data using external network 74, may cause presence-sensitive display 92 to output the GUI. In response to receiving one or more user inputs, such as a gesture at presence-sensitive display 92 (e.g., at a region of presence-sensitive display 92), visual display device 90 and other of input devices 4 may send indications of the inputs to computing device 60 using external network 74. Communication unit 70 of may receive the indications of the inputs, and send the indications to computing device 60.

Computing device 60 may, in the example of FIG. 3, receive a communication. Computing device 60 may output an indication of the received communication (e.g., for display). For instance, computing device 60 may send data for a visual representation of the received communication to communication unit 70. Communication unit 70 may send the data to visual display device 90 via external network 74. Visual display device 90 may cause presence-sensitive display 92 to output the visual representation of the received communication for display.

Responsive to receiving an indication of user input to respond to the received communication (e.g., input performed at one of input devices 42), computing device 60 (e.g., communication action module 12) may determine one or more candidate responses. Computing device 60 may send data for a visual representation of at least one of the one or more candidate responses to communication unit 70 for display.

Computing device 60 may receive input that selects a candidate response from the one or more candidate responses and may send the candidate response (e.g., in response to the received communication). Computing device 60 may determine an operation that is contextually related to the candidate response and execute the operation. In some examples, as part of performing the operation, computing device 60 may output a GUI for display. That is, computing device 60 may send data for a visual interface to communication unit 70. Communication unit 70 may send the data to visual display device 90 via external network 74. Visual display device 90 may cause presence-sensitive display 92 to output the visual interface (e.g., to a user).

Figure 4:
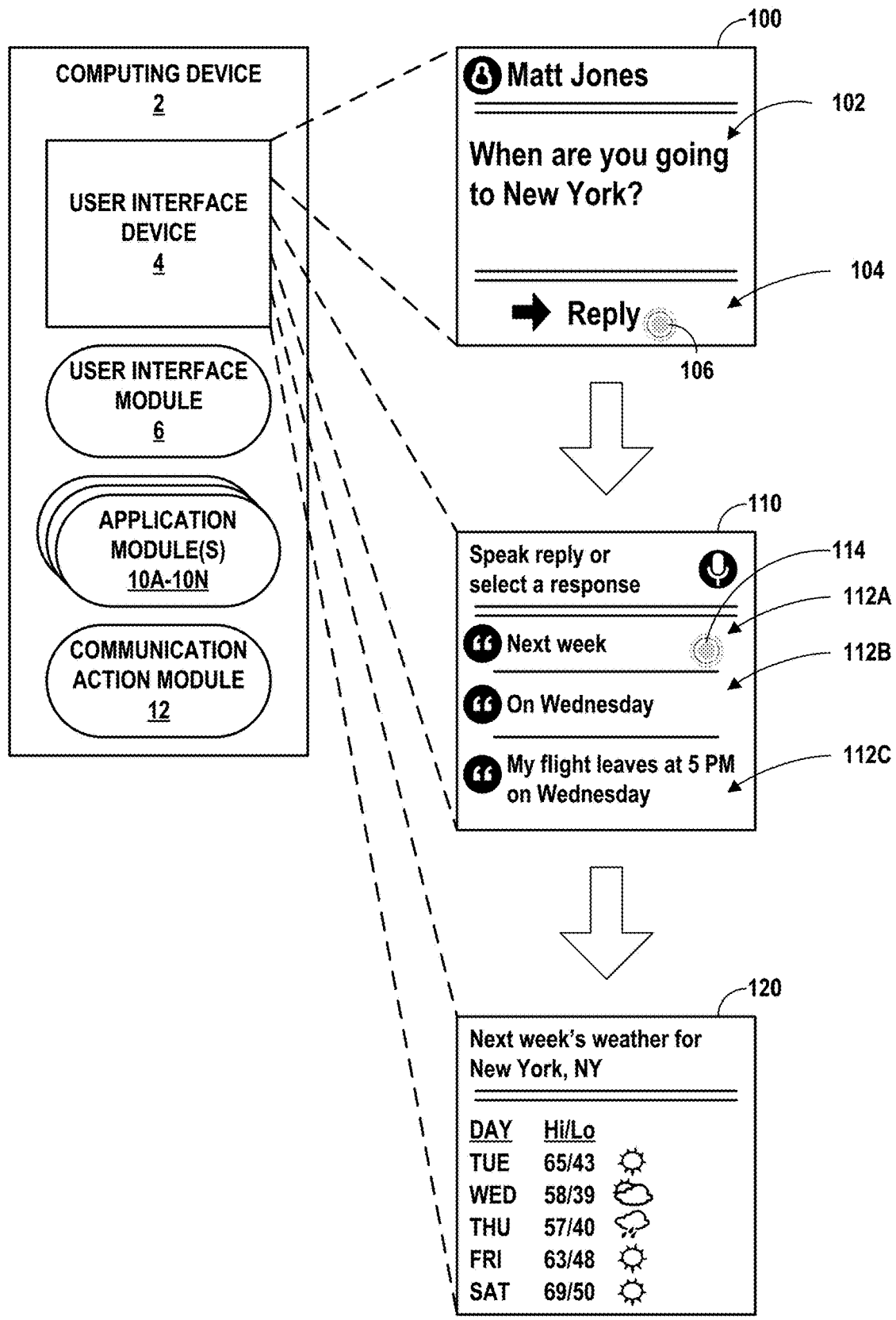
FIG. 4 is a block diagram illustrating an example computing device and GUIs for performing contextually related operations responsive to sending a response to a received communication, in accordance with one or more techniques of the present disclosure.

FIG. 4 is a block diagram illustrating an example computing device 2 and GUIs 100, 110, and 120 for performing contextually related operations responsive to sending a response to a received communication, in accordance with one or more techniques of the present disclosure. For purposes of illustration only, the example of FIG. 4 is described below within the context of FIGS. 1 and 2. As shown in the example of FIG. 4, computing device 2 includes UI device 4, UI module 6, application modules 10, and communication action module 12. The components of computing device 2 may, in the example of FIG. 4, have functionality that is the same as or similar to that described with respect to FIGS. 1 and 2.

In some examples, performing one or more operations that are contextually related to a selected candidate response may include performing one or more operations to obtain and/or output information about a subject of the selected candidate response and/or the received communication. That is, responsive to receiving input (e.g., from a user) to select a response to a received communication, a computing device implementing techniques of the present disclosure may, in some examples, determine an operation to provide a user with information about a subject (e.g., a person, a location, an item or object, etc.) included in the communications. Examples of information about a subject included in the communications may include weather information about a location, travel information to a location (e.g., turn-by-turn driving directions, public transportation directions, available flights to the location, or other travel information), reviews of a location or object (e.g., a restaurant, a store, a movie, etc.) such as user reviews from social media network services or critic reviews, biographical information about a person, social media network service accounts for a subject or information obtained therefrom, recent news articles or media stories about a subject, availability of an item or object for purchase (e.g., from one or more stores, shopping or auction websites or elsewhere), or other information about the subject that may be useful to a user. In other words, determining an operation that is contextually related to a candidate response may, in some examples, include determining an operation to obtain information about a subject included in the received communication and/or the candidate response.

In accordance with the techniques described herein, computing device 2 may receive a communication, such as an instant message, that includes the text, "When are you going to New York?" One or more components of computing device 2 (e.g., one of application modules 10) may cause UI device 4 to output GUI 100 for display. For instance, in the example of FIG. 4, computing device 2 may provide the received communication to one of application modules 10 that is designated to handle instant messages (e.g., application module 10B). Application module 10B may send information to UI module 6 to cause GUI 100 to be output for display at UI device 4. In some examples, GUI 100 may be output in response to receiving the instant message. In some examples, GUI 100 may be output in response to input provided by a user instructing computing device 2 to display the instant message.

In the example of FIG. 4, GUI 100 includes text 102 and user-selectable element 104. Text 102 may be a representation of at least a portion of the information included in the instant message. In some examples, text 102 may represent all the information included in the instant message. In some examples, the instant message may include additional or other information. Element 104 may be an object of the GUI that a user may select to provide input instructing computing device 2 to respond to the instant message.

Computing device 2 may, in the example of FIG. 4, receive input (e.g., selection 106) selecting element 104. That is, UI device 4 may receive selection 106 and send data representing the input to UI module 6. UI module 6 may receive the data and provide an indication of the input to application module 10B. Application module 10B may determine that the input corresponds to a selection of element 104. Consequently, application module 10B may request candidate responses from communication action module 12.

In the example of FIG. 4, communication action module 12 may receive the request and determine candidate responses to the instant message. In order to determine candidate responses, communication action module 12 may parse the information included in the instant message and search for combinations of words and/or punctuation marks using one or more lookup tables to determine a semantic meaning of the instant message (e.g., what the instant message is about). For instance, Communication action module 12 may determine that the word "when" and the punctuation mark "?" together indicate a request for a time value. Communication action module 12 may also determine that the words "going to" represent an action and that that the words "you" and "New York" represent subjects.

Communication action module 12 may, in the example of FIG. 4, obtain various types of contextual information in order to determine candidate responses. That is, communication action module 12 may obtain information about computing device 2 and/or about the user of computing device 2. Based on the information, communication action module 12 may determine that the user is flying to New York City next Wednesday. For instance, communication action module 12 may obtain contextual information from an email account of the user that indicates a purchase of a ticket to New York leaving at 5:23 PM on Apr. 23, 2014 for a person named Bryan Dons. Communication action module 12 may obtain contextual information from computing device 2 indicating that the user's name is Bryan Dons. Communication action module 12 may also obtain contextual information from a clock of computing device 2 indicating that the current date is Apr. 17, 2014. Based on this information, communication action module 12 may determine that the user is travelling to New York by flight at approximately 5 PM next week, Wednesday. Based on the information included in the instant message and the obtained contextual information, communication action module 12 may determine one or more candidate responses and send the candidate responses to application module 10B.

Application module 10B may receive the candidate responses and send information to UI module 6 to cause UI device 4 to output GUI 110 for display. As shown in the example of FIG. 4, GUI 110 includes response options 112A, 112B, and 112C (collectively, "response options 112"). Each of responses options 112 may correspond to a respective candidate response. In the example of FIG. 4, the candidate responses determined by communication action module 12 may be based on varying levels of privacy. That is, the candidate response corresponding to response option 112A indicates only a general response, while the candidate responses corresponding to response options 112B and 112C may be increasingly more specific responses. This may allow the user to select his or her desired level of privacy for the interaction. That is, in some examples, communication action module 12 may determine candidate responses that provide varying levels of privacy to the user, thereby allowing the user to select how much or how little of his or her information he or she would like to share in a response.

In the example of FIG. 4, computing device 2 may receive an indication of user input (e.g., selection 114) that selects response option 112A (e.g., corresponding to the candidate response, "Next week"). That is, UI device 4 may receive selection 114 and send data representing the input to UI module 6. UI module 6 may receive the data and provide an indication of the input to application module 10B. Application module 10B may determine that the input corresponds to a selection of response option 112A.

Responsive to receiving the indication of user input that selects response option 112A, application module 10B may cause computing device 2 to send the candidate response "Next week" as an instant message. That is, responsive to receiving the indication of user input that selects a candidate response, computing device 2 may send the candidate response. Application module 10B may also send an indication of the candidate response to communication action module 12.

Communication action module 12 may, in the example of FIG. 4, receive the indication of the candidate response and determine one or more operations to obtain information about a subject or subjects included in the instant message and/or the selected candidate response. For instance, communication action module 12 may parse the language of the selected candidate response using lookup tables, in a fashion similar to the parsing of the received communication. Consequently, communication action module 12 may determine a relative time value, "next week" from the candidate response. Communication action module 12 may use the relative time value, along with the subjects "New York" and "You," and the action "going to" as input for a lookup table that stores contextually relevant operations. The input values, together, may correspond to an operation to provide weather information about the location. That is, the lookup table may indicate that an affirmative action of travel (e.g., "going to"), a geographic location (e.g., "New York"), and a relative time (e.g., "next week"), together, correspond to a contextually related operation to provide weather information about the location.

In the example of FIG. 4, communication action module 12 may execute the operation. For instance, communication action module 12 may call an API of a weather application of computing device 2, the call providing the relevant location and time frame (e.g., New York, N.Y. and next week). The weather application may execute and send data to UI module 6 that causes UI device 4 to output GUI 120. As shown in the example of FIG. 4, GUI 120 shows the weather for New York, N.Y. next week.

While described in the example of FIG. 4 as providing weather information about a subject included in the received communication and/or selected response, contextually related operations may provide various other types of information about communication subjects. For instance, if communication action module 12 determines a location of New York, a relative time of next week, and an action of "want to go," communication action module 12 may determine an operation to provide travel options to New York City. As another example, if communication action module 12 determines an action of "want to go," and a "request for location" (e.g., based on the word "where" and a question mark character in a received communication), and determines a location of "Yotteru Sushi Restaurant" (e.g., entered by a user as a custom response), communication action module 12 may determine an operation to provide restaurant reviews of Yotteru Sushi Restaurant. Various other types of information may be provided in a number of examples, in accordance with the techniques of the present disclosure.

Figure 5:
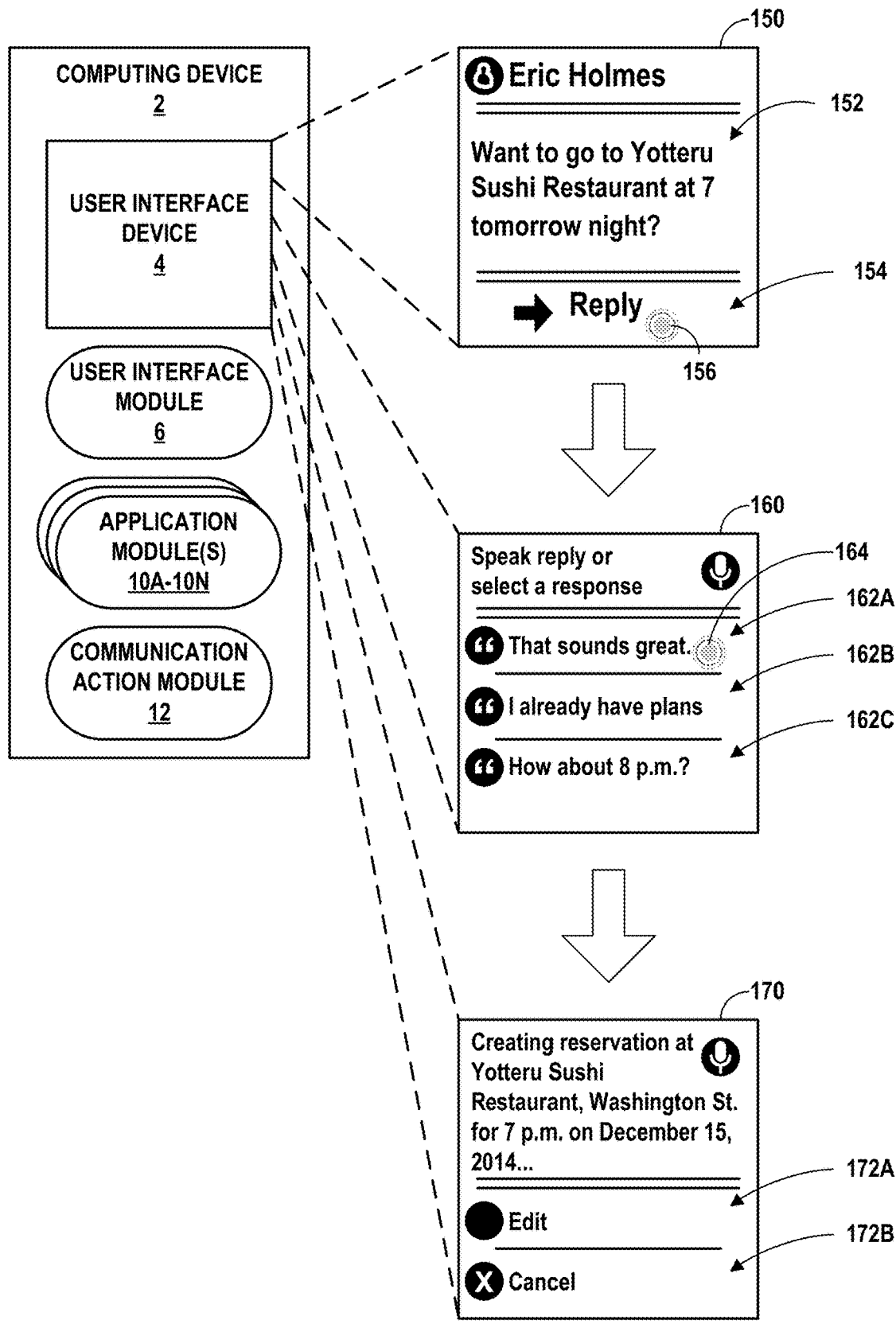
FIG. 5 is a block diagram illustrating an example computing device and GUIs for performing contextually related operations responsive to sending a response to a received communication, in accordance with one or more techniques of the present disclosure.

FIG. 5 is a block diagram illustrating an example computing device 2 and GUIs 150, 160, and 170 for performing contextually related operations responsive to sending a response to a received communication, in accordance with one or more techniques of the present disclosure. For purposes of illustration only, the example of FIG. 5 is described below within the context of FIGS. 1 and 2. As shown in the example of FIG. 5, computing device 2 includes UI device 4, UI module 6, application modules 10, and communication action module 12. The components of computing device 2 may, in the example of FIG. 5, have functionality that is the same as or similar to that described with respect to FIGS. 1 and 2.

In some examples, performing one or more operations that are contextually related to a selected candidate response may include performing one or more operations to create, modify, or remove scheduling items. That is, responsive to receiving input (e.g., from a user) to select a response to a received communication, a computing device implementing techniques of the present disclosure may, in some examples, determine an operation to create, modify, or remove scheduling items associated with a subject (e.g., a person, a location, an item or object, etc.) included in the communications. Examples of operations that create, modify or remove scheduling items may include operations to create, modify, or remove a calendar event on a calendar associated with the user, operations to create, modify, or remove an event on a social media network service using an account associated with the user, operations to create, modify, or remove a reservation (e.g., a table reservation at a restaurant, a hotel reservation, a rental reservation, a reservation for a plane flight, bus trip, or movie, a reservation for a meeting room, etc.), operations to create, modify, or remove a service appointment, or other operation to address a scheduling item that may be useful to a user. In other words, determining an operation that is contextually related to a candidate response may, in some examples, include determining an operation to create a scheduling item, modify a scheduling item, or remove a scheduling item that relates to the received communication and/or the selected response.

In accordance with the techniques described herein, computing device 2 may receive a communication, such as an email, that includes the text, "Want to go to Yotteru Sushi Restaurant at 7 tomorrow night?" One or more components of computing device 2 (e.g., one of application modules 10) may cause UI device 4 to output GUI 150 for display. For instance, in the example of FIG. 5, computing device 2 may provide the received communication to one of application modules 10 that is designated to handle email messages (e.g., application module 10C). Application module 10C may send information to UI module 6 to cause GUI 150 to be output for display at UI device 4. In some examples, GUI 150 may be output in response to receiving the email. In some examples, GUI 150 may be output in response to input provided by a user instructing computing device 2 to display the email.

In the example of FIG. 5, GUI 150 includes text 152 and user-selectable element 154. Text 152 may be a representation of at least a portion of the information included in the email. In some examples, text 152 may represent all the information included in the email. In some examples, the email may include additional or other information, such as header information. Element 154 may be an object of the GUI that a user may select to provide input instructing computing device 2 to respond to the email.

Computing device 2 may, in the example of FIG. 5, receive input (e.g., selection 156) selecting element 154. That is, UI device 4 may receive selection 156 and send data representing the input to UI module 6. UI module 6 may receive the data and provide an indication of the input to application module 10C. Application module 10C may determine that the input corresponds to a selection of element 154. Consequently, application module 10C may request candidate responses from communication action module 12.

In the example of FIG. 5, communication action module 12 may receive the request and determine candidate responses to the email. In order to determine candidate responses, communication action module 12 may parse the information included in the email using natural language processing or other language processing techniques to determine a semantic meaning for the instant message (e.g., what the instant message is about). For instance, Communication action module 12 may determine that the instant message is requesting information from the user about an action the user is taking with respect to a location, New York.

Communication action module 12 may, in the example of FIG. 5, obtain various types of contextual information in order to determine candidate responses. That is, communication action module 12 may obtain information about computing device 2 and/or about the user of computing device 2. Based on the information, communication action module 12 may determine that the user has a meeting until 7 PM tomorrow night. For instance, communication action module 12 may obtain contextual information from a calendar application of the user that indicates a meeting item from 5 PM to 7 PM on Apr. 18, 2014. Communication action module 12 may also obtain contextual information from a clock of computing device 2 indicating that the current date is Apr. 17, 2014. Based on this information, communication action module 12 may determine that the user has a scheduled meeting until 7 PM tomorrow night. Based on the information included in the email, metadata or other information about the email, and/or the obtained contextual information, communication action module 12 may determine one or more candidate responses and send the candidate responses to application module 10C.

Application module 10C may receive the candidate responses and send information to UI module 6 to cause UI device 4 to output GUI 160 for display. As shown in the example of FIG. 5, GUI 160 includes response options 162A, 162B, and 162C (collectively, "response options 162"). Each of responses options 162 may correspond to a respective candidate response. In the example of FIG. 5, the candidate responses determined by communication action module 12 may include the candidate response "That sounds great," "I already have plans," and "How about 8 p.m.?"

In the example of FIG. 5, computing device 2 may receive an indication of user input (e.g., selection 164) that selects response option 152A (e.g., corresponding to the candidate response, "that sounds great"). That is, UI device 4 may receive selection 164 and send data representing the input to UI module 6. UI module 6 may receive the data and provide an indication of the input to application module 10C. Application module 10C may determine that the input corresponds to a selection of response option 162A.

Responsive to receiving the indication of user input that selects response option 162A, application module 10C may cause computing device 2 to send the candidate response "That sounds great" as an email. That is, responsive to receiving the indication of user input that selects a candidate response, computing device 2 may send the candidate response. Application module 10C may also send an indication of the candidate response to communication action module 12.

Communication action module 12 may, in the example of FIG. 5, receive the indication of the candidate response and determine one or more operations to create, modify, or remove a scheduling item related to the subject or subjects included in the email and/or the selected candidate response. For instance, communication action module 12 may parse the language of the selected candidate response using natural language processing techniques, in a fashion similar to the parsing of the received communication. Consequently, communication action module 12 may determine that the user responded in the affirmative to the social reservation request. Communication action module 12 may use the indication of affirmation, the indication of a location (e.g., Yotteru Sushi Restaurant), the indication of location type (e.g., restaurant) and the indication of time (e.g., tomorrow at 9 PM) to determine an operation. For instance, communication action module 12 may determine that affirming a location of the restaurant type at a specific time, together, corresponds to a contextually related operation to create a reservation with the indicated restaurant at the indicated time.

In the example of FIG. 5, communication action module 12 may execute the operation. For instance, communication action module 12 may call an API of a restaurant application or reservation application of computing device 2, the call providing the relevant restaurant, restaurant location, and time (e.g., Yotteru Sushi Restaurant, 250 E 6th street, and Friday April 18 at 7 PM). The receiving application may execute and send data to UI module 6 that causes UI device 4 to output GUI 170.

As shown in the example of FIG. 5, GUI 170 may indicate to the user of computing device 2 that computing device 2 is performing or about to perform the operation to create a reservation. GUI 170 includes user selectable elements that may enable the user to modify or cancel the operation, such as elements 172A and 172B. In some examples, if computing device 2 does not receive an indication of input that selects one of elements 172A or 172B within a threshold amount of time, computing device 2 (e.g., application module 10C) may perform the operation and create the reservation.

While described in the example of FIG. 5 as creating a table reservation at a restaurant indicated in the received communication and/or selected response, contextually related operations may create, modify, or remove various other types of scheduling events related to communication subjects. For instance, if communication action module 12 determines that the received communication indicates someone will be late to a shared meeting, and the response communication is an acceptance of this information, communication action module 12 may determine an operation to modify the meeting event to start at a later time. As another example, if communication action module 12 determines that the received communication indicates that a user is invited to a meeting in a first city, that the response communication accepts the meeting, and that the user has a hotel reservation for the same day in a second city, communication action module 12 may determine an operation to cancel the hotel reservation (e.g., in some examples, after prompting the user for confirmation).

Figure 6:
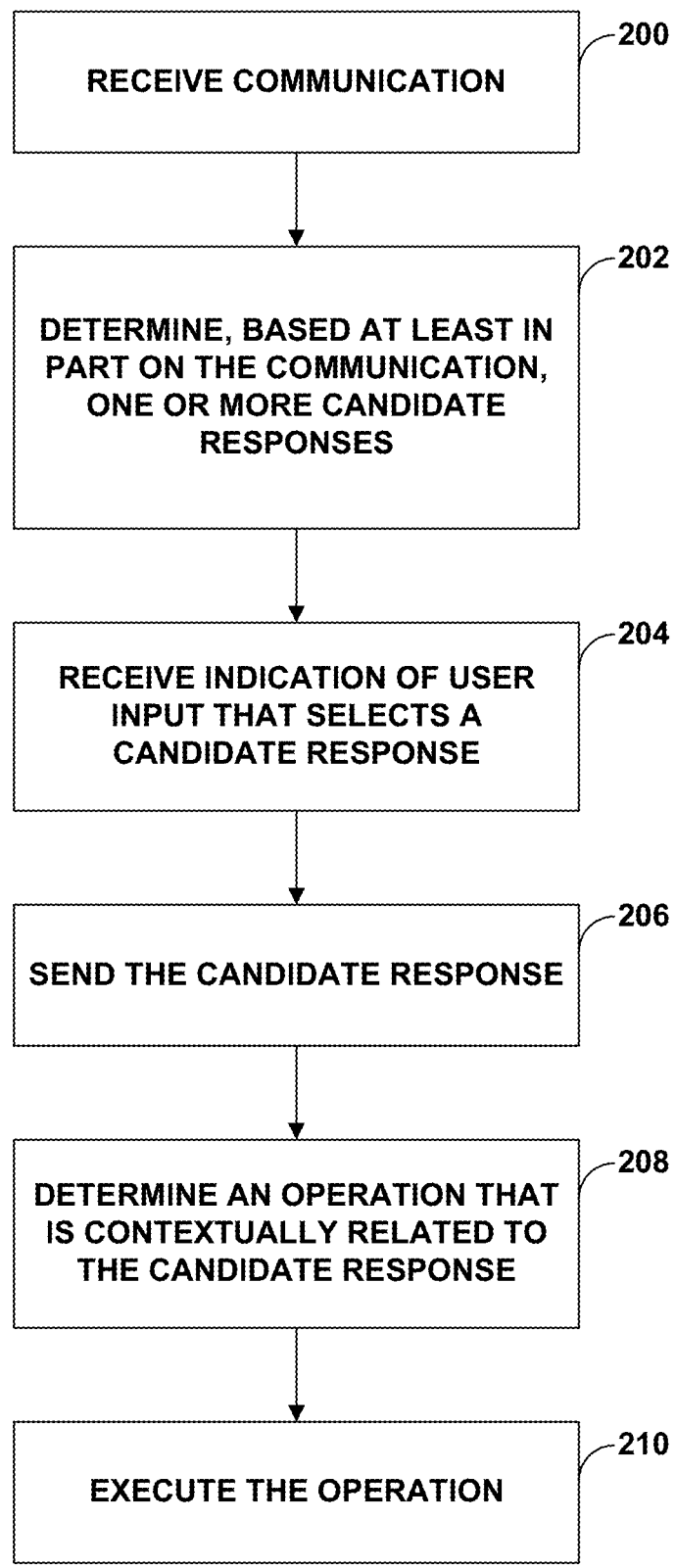
FIG. 6 is a flow diagram illustrating example operations of a computing device for performing contextually related operations responsive to sending a response to a received communication, in accordance with one or more techniques of the present disclosure.

FIG. 6 is a flow diagram illustrating example operations of a computing device for performing contextually related operations responsive to sending a response to a received communication, in accordance with one or more techniques of the present disclosure. For purposes of illustration only, the example operations of FIG. 6 are described below within the context of FIGS. 1 and 2.

In the example of FIG. 6, computing device 2 may receive a communication (200). Computing device 2 may determine one or more candidate responses to the received communication, based at least in part on the communication (202). For instance, computing device 2 may select candidate responses from a number of stored candidate responses, use predictive techniques to generate candidate responses, and/or send a request for candidate responses to one or more other computing devices.

Computing device 2 may, in the example of FIG. 6, receive an indication of user input that selects a candidate response from the one or more candidate responses (204). Responsive to receiving the indication of user input that selects the candidate response, computing device 2 may send the candidate response (206). For instance, computing device 2 may send the candidate response to the computing device from which the communication was received.

In the example of FIG. 6, computing device 2 may determine an operation that is contextually related to the candidate response (208). The operation may be contextually related to the candidate response based at least in part on at least one of the candidate response and the received communication. For instance, computing device 2 may select one or more contextually related operations from a number of stored operations, use predictive techniques to determine one or more contextually related operations, or send a request for one or more contextually related operations to one or more other computing devices. Computing device 2 may execute the operation (210).

The example operations of FIG. 6 may also be described by one or more of the examples below.

A computing device or system configured in accordance with the techniques described herein may parse out a question from a received communication, such as an email. The computing device may determine candidate responses by sending the question through a voice search module. In some examples, the question may be sent with the same access rights as a user or owner of the system. The voice search module may provide a number of possible responses (e.g., ordered by confidence). The system may present the possible responses to a user (e.g., at a display device). The system may allow the user to select a response from a list of responses, speak a custom response, or both. In some examples, the system may present the user with an action related to the response. For instance, selecting "thanks for the address, I'm on my way" could cause the system to open an action to start directions to the received address.

In some examples, such as where a user of the system grants full trust to a specific contact, the system may automatically reply to messages received from that person without any interaction from the user. That is, the system may send responses automatically, in a true "zero interaction, zero attention" experience. In some examples, the system may be enabled to receive candidate responses from other sources, such as other application modules. For instance, the system may receive answers to questions about restaurant bookings from a reservation application. In some examples, the user's context can be taken into consideration, and response options may be provided that are based on the context, such as "I'll get back to you after running" or "I'll get back to you after being stuck in traffic." The techniques described herein may be applicable to all types of communications, including SMS or text messages, emails, chat messages or IM messages, etc.

In some examples, existing voice search technology and existing actions may ease implementation of the techniques described herein. That is, by connecting the data flows in new ways, a computing device, such as a mobile phone may move closer to becoming a true assistant that can handle information exchange in a fast, platform-independent and efficient way. Because the user is in full control of what is shared, the user's privacy does not need to be compromised. Using techniques of the present disclosure, a user may be able to cause a computing device to respond to a received communication with complex information in a very short time (e.g., in as few as one or two interactions and in as little as one or two seconds). By automatically researching calendar information, email information, contact information, and other information, a computing device implementing the techniques described herein may provide complete information without the user searching through each type of information to determine such a complete understanding. Furthermore, by automatically performing actions based on responses, a computing device implementing the techniques described herein may allow users to easily perform common tasks.

One example of providing candidate responses may include receiving the message "Hey, are you doing anything tonight?" and providing the responses "Meeting with Alex from 6 to 8," "I'm busy until 8 pm," and "I'm busy, sorry." Another example may include receiving the message "Can you meet us for dinner at 9 pm?" and providing the responses "Yes, see you then" and "How about tomorrow night at 8 pm?" Furthermore, responsive to receiving input from a user to select the response "Yes, see you then," a computing device implementing the techniques described herein may create a calendar event for dinner at 9 pm. Another example of providing candidate responses may include receiving the message "Do you have Sarah's phone number?" and providing the responses "Sara Louis 555-123-4567," "Sara Lane 555-123-4556," and "No, sorry."

Another example of providing candidate responses may include receiving the message "Please remember to pick up milk" and providing the responses "Will do," "Where?," and "When?" Furthermore, responsive to receiving input from a user to select the response "Will do," a computing device implementing the techniques described herein may add a reminder to pick up milk in one hour. Another example of providing candidate responses may include receiving the message "Where are you?" and providing the responses "At home," "North Beach," and "5366 Broadway, San Francisco." Furthermore, responsive to receiving input from a user to select a response, a computing device implementing the techniques described herein may attach a map to the message. Another example of providing candidate responses may include receiving the message "How tall is Barack Obama?" and providing the response "6' 1" (1.85 m)." Another example may include receiving the message "Which flight are you on?" and providing the response "UA555 SFO-ORD, Delayed 1 hour, 10:49 pm, Terminal 3."

Another example of providing candidate responses may include receiving the message "Did you call Larry?" and providing the responses "Yes" and "No." Furthermore, responsive to receiving input from a user to select a response, a computing device implementing the techniques described herein may initiate a phone call to Larry. Another example of providing candidate responses may include receiving the message "Call me" and providing the responses "OK" and "I'll call you tonight at 6 pm." Furthermore, responsive to receiving input from a user to select the response "OK," a computing device implementing the techniques described herein may initiate a phone call to the sender of the received message. Another example of providing candidate responses may include receiving the message "When is Matt's party?" and providing the responses "Saturday, 9 pm" and "I don't know."

EXAMPLE 1

A method comprising: receiving, by a computing device, a communication; determining, based at least in part on the communication, one or more candidate responses to the communication; receiving, by the computing device, an indication of user input that selects a candidate response from the one or more candidate responses; and responsive to receiving the indication of user input that selects the candidate response: sending, by the computing device, the candidate response, determining, based at least in part on at least one of the candidate response and the communication, an operation that is contextually related to the candidate response, and executing, by the computing device, the operation.

EXAMPLE 2

The method of example 1, wherein the candidate response has a semantic meaning, and determining the operation that is contextually related to the candidate response further comprises: determining one or more operations that were previously performed in association with a previous response having a semantic meaning that is substantially similar to the semantic meaning of the candidate response.

EXAMPLE 3

The method of example 2, wherein each respective operation of the one or more operations is associated with a respective context and wherein determining the operation that is contextually related to the candidate response further comprises: determining a current context of the computing device, the current context including a first group of one or more items of contextual information; and determining for each respective operation of the one or more operations, a respective score based on a respective second group of items of contextual information included in the respective context associated with the respective operation, the respective second group of items being substantially similar to the first group of one or more items, wherein the operation that is contextually related to the candidate response is determined based at least in part on the respective scores for each of the one or more operations.

EXAMPLE 4

The method of example 1, wherein determining the operation that is contextually related to the candidate response further comprises: determining a first group of one or more semantic elements of at least one of the candidate response and the communication; determining, based at least in part on the first group of one or more semantic elements, a plurality of operations; and determining a plurality of respective scores, each respective score from the plurality of respective scores associated with a respective operation from the plurality of operations, wherein the respective score associated with the respective operation represents a respective degree of similarity, within a range of degrees of similarity, between the first group of one or more semantic elements and a respective second group of one or more semantic elements associated with the respective operation, wherein executing the operation comprises executing a particular operation, from the plurality of operations, that is associated with a highest score from the plurality of respective scores.

EXAMPLE 5

The method of example 1, wherein determining the operation that is contextually related to the candidate response further comprises: determining a semantic meaning of at least one of the candidate response and the communication; and determining, based at least in part on the semantic meaning, a registered application, wherein the operation that is contextually related to the candidate response comprises executing the registered application based on information included in at least one of the candidate response and the communication.

EXAMPLE 6

The example of any of examples 1-5, wherein determining the one or more candidate responses to the communi-cation further comprises: determining a semantic meaning of the communication; and determining one or more responses that were previously selected to respond to a previously received communication having a semantic meaning that is substantially similar to the semantic meaning of the communication.

EXAMPLE 7

The method of example 6, wherein each respective response of the one or more responses is associated with a respective context and wherein determining the one or more candidate responses to the communication further comprises: determining a current context of the computing device, the current context including a first group of one or more items of contextual information; and determining for each respective response of the one or more responses, a respective score based on a second group of items of contextual information included in the respective context associated with the respective response, the respective second group of items being substantially similar to the first group of one or more items, wherein the one or more candidate responses to the communication are determined based at least in part on the respective scores for each of the one or more responses.

EXAMPLE 8

The method of any of examples 1-7, further comprising: determining a current context of the computing device, the current context indicating at least one of: a location of the computing device, a time determined by the computing device, one or more applications installed at the computing device, one or more applications currently executing at the computing device, one or more networks available to the computing device, one or more other computing devices in proximity to the computing device, an operating mode of the computing device, an ambient temperature around the computing device, an ambient noise level around the computing device, an ambient light level around the computing device, an acceleration of the computing device, a name of a user of the computing device, a user identifier of the user, a social media network service account associated with the user, a calendar of the user, and one or more social contacts of the user, wherein determining the one or more candidate responses to the communication is based at least in part on the current context of the computing device.

EXAMPLE 9

The method of any of examples 1-8, wherein at least one of the candidate response and the communication indicates a location, and wherein determining the operation comprises: determining travel directions to the location; and outputting at least a portion of the travel directions.

EXAMPLE 10

The method of any of examples 1-8, wherein at least one of the candidate response and the communication indicates a location, and wherein determining the operation comprises: determining weather information about the location; and outputting at least a portion of the weather information.

EXAMPLE 11

The method of examples 1-8, wherein determining the operation that is contextually related to the candidate response comprises at least one of: creating a scheduling item managed by a scheduling application; modifying the scheduling item managed by the scheduling application; and removing the scheduling item managed by the scheduling application.

EXAMPLE 12

The method of example 11, wherein the scheduling item is a calendar event, and wherein creating, modifying, or removing the scheduling item comprises: creating the calendar event managed by a calendar application; modifying the calendar event managed by the calendar application; or removing the calendar event managed by the calendar application.

EXAMPLE 13

The method of example 11, wherein the scheduling item is a reservation, and wherein creating, modifying, or removing the scheduling item comprises: creating the reservation managed by a reservation application; modifying the reservation managed by the reservation application; or removing the reservation managed by the reservation application.

EXAMPLE 14

The method of example 13, wherein the reservation comprises at least one of: a table reservation; a room reservation; a hotel reservation; a flight reservation; and a rental car reservation.

EXAMPLE 15

The method of any of examples 1-14, further comprising: determining at least one application module installed at the computing device; and determining the operation that is contextually related to the candidate response based at least in part on the at least one application module being installed at the computing device.

EXAMPLE 16

The example of any of claims 1-15, further comprising determining a current context of the computing device, the current context comprising one or more items of contextual information; determining a time frame throughout which a context of at least one of the computing device and another computing device comprised at least one item of contextual information included in the current context; and determining a previous operation that was performed by the at least one of the computing device and another computing device during the time frame.

EXAMPLE 17

The method of any of examples 1-16, wherein determining the operation that is contextually related to the candidate response comprises: determining at least one of: information that is included in the at least one of the candidate response and the communication, metadata about the at least one of the candidate response and the communication, one or more other communications, and contextual information associated with the at least one of the candidate response and the communication; and determining the operation that is contextually related to the candidate response based at least in part on at least one of: the information that is included in the at least one of the candidate response and the communication, the metadata about the at least one of the candidate response and the communication, the one or more other communications, and the contextual information associated with the at least one of the candidate response and the communication.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by a communication application executing at a computing device, a message;
determining, by the communication application, what other applications are available at the computing device to perform operations related to the message;
selecting, by the communication application, from the other applications that are available to the computing device, and based at least in part on a group of semantic elements associated with the message, a calendar application as being associated with the message; and
causing, by the communication application, automatically and without user interaction, the calendar application to execute an operation that generates calendar information about one or more of the semantic elements from the group of semantic elements;
determining, by the communication application, using at least part of the calendar information, one or more candidate responses to the message;
receiving, by the computing device, an indication of user input that selects a candidate response from the one or more candidate responses; and
responsive to receiving the indication of user input that selects the candidate response, sending, by the communication application, automatically, without further user interaction, and, as a reply to the message, the candidate response.

2. The method of claim 1, wherein the candidate response has a semantic meaning, the method comprising:
determining the operation was previously performed in association with a previous response having a semantic meaning that is substantially similar to the semantic meaning of the candidate response.

3. The method of claim 1, further comprising:
determining a semantic meaning of the message; and
determining, based at least in part on the semantic meaning, the calendar application,
wherein causing the calendar application to execute the operation comprises causing the calendar application to execute the operation based on information included in the message.

4. The method of claim 1, wherein determining one or more candidate responses to the message comprises:
determining a semantic meaning of the message; and
determining one or more responses that were previously selected to respond to a previously received message having a semantic meaning that is substantially similar to the semantic meaning of the message.

5. The method of claim 1, wherein each respective response of the one or more responses is associated with a respective context, and wherein determining the one or more candidate responses to the message further comprises:

determining a current context of the computing device, the current context including a first group of one or more items of contextual information; and
determining for each respective response of the one or more responses, a respective score based on a respective second group of items of contextual information included in the respective context associated with the respective response, the respective second group of items being substantially similar to the first group of one or more items, wherein
the one or more candidate responses to the message are determined based at least in part on the respective scores for each of the one or more responses.

6. The method of claim 1, further comprising:
determining a current context of the computing device, the current context indicating at least one of: a location of the computing device, a time determined by the computing device, one or more applications installed at the computing device, one or more applications currently executing at the computing device, one or more networks available to the computing device, one or more other computing devices in proximity to the computing device, an operating mode of the computing device, an ambient temperature around the computing device, an ambient noise level around the computing device, an ambient light level around the computing device, an acceleration of the computing device, a name of a user of the computing device, a user identifier of the user, a social media network service account associated with the user, a calendar of the user, and one or more social contacts of the user,
wherein determining the one or more candidate responses to the message is based at least in part on the current context of the computing device.

7. The method of claim 1, wherein the calendar application comprises a scheduling application and the operation comprises at least one of:
creating a scheduling item managed by the scheduling application;
modifying the scheduling item managed by the scheduling application; and
removing the scheduling item managed by the scheduling application.

8. The method of claim 1, wherein the message is received by the communication application executing at the computing device and the reply to the message is automatically sent by the communication application.

9. The method of claim 1, wherein selecting the calendar application comprises:
determining, based at least in part on the group of semantic elements associated with the message, one or more respective scores for each of the other applications;
selecting, from the other applications, the calendar application in response to determining that the calendar application has a highest score from the one or more respective scores.

10. A computing device comprising at least one processor configured to execute a communication application configured to:
receive a message;
determine what other applications are available at the computing device to perform operations related to the message;
select, from the other applications that are available to the computing device and based at least in part on a group of semantic elements associated with the message, a calendar application as being associated with the message;

cause, automatically and without user interaction, the calendar application to execute an operation that generates calendar information about one or more of the semantic elements from the group of semantic elements;

determine, using at least part of the calendar information, one or more candidate responses to the message;

receive an indication of user input that selects a candidate response from the one or more candidate responses; and responsive to receiving the indication of user input that selects the candidate response, send, automatically, without further user interaction, and as a reply to the message, the candidate response.

11. The computing device of claim 10, wherein the candidate response has a semantic meaning, the at least one processor being further configured to:

determine the operation was previously performed in association with a previous response having a semantic meaning that is substantially similar to the semantic meaning of the candidate response.

12. The computing device of claim 10, wherein the at least one processor is further configured to:

determine a semantic meaning of the message;

determine, based at least in part on the semantic meaning, the application; and cause the calendar application to execute the operation by causing the calendar application to execute the operation based on information included in the message.

13. A non-transitory computer-readable storage medium comprising instructions that, when executed, cause at least one processor of a computing device to execute a communication application configured to:

receive a message;

determine what other applications are available at the computing device to perform operations related to the message;

select, from the other applications that are available to the computing device and based at least in part on a group of semantic elements associated with the message, a calendar application as being associated with the message;

cause, automatically and without user interaction, the calendar application to execute an operation that generates calendar information about one or more of the semantic elements from the group of semantic elements;

determine, using at least part of the calendar information, one or more candidate responses to the message;

receive an indication of user input that selects a candidate response from the one or more candidate responses; and responsive to receiving the indication of user input that selects the candidate response, send, automatically, without further user interaction, and as a reply to the message, the candidate response.

* * * * *